US011166072B2

(12) United States Patent
He et al.

(10) Patent No.: US 11,166,072 B2
(45) Date of Patent: Nov. 2, 2021

(54) METRICS AND MESSAGES TO IMPROVE EXPERIENCE FOR 360-DEGREE ADAPTIVE STREAMING

(71) Applicant: VID SCALE, INC., Wilmington, DE (US)

(72) Inventors: Yong He, San Diego, CA (US); Yan Ye, San Diego, CA (US); Ali C. Begen, Konya (TR)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 16/496,670

(22) PCT Filed: Mar. 23, 2018

(86) PCT No.: PCT/US2018/023971
§ 371 (c)(1),
(2) Date: Sep. 23, 2019

(87) PCT Pub. No.: WO2018/175855
PCT Pub. Date: Sep. 27, 2018

(65) Prior Publication Data
US 2020/0037029 A1  Jan. 30, 2020

Related U.S. Application Data

(60) Provisional application No. 62/475,563, filed on Mar. 23, 2017, provisional application No. 62/525,065, (Continued)

(51) Int. Cl.
*H04N 21/81* (2011.01)
*H04N 21/442* (2011.01)
(Continued)

(52) U.S. Cl.
CPC . *H04N 21/44218* (2013.01); *H04N 21/23439* (2013.01); *H04N 21/4728* (2013.01); *H04N 21/816* (2013.01)

(58) Field of Classification Search
CPC ....... H04N 21/44218; H04N 21/23439; H04N 21/4728; H04N 21/816; H04N 21/6587;
(Continued)

(56) References Cited

U.S. PATENT DOCUMENTS 10,600,153 B2  3/2020 Roimela et al.
2013/0195204 A1  8/2013 Reznik et al.
(Continued)

FOREIGN PATENT DOCUMENTS

CN  101872243 A  10/2010
CN  104067628 A  9/2014
(Continued)

OTHER PUBLICATIONS

Chang et al., "Performance Measurements of Virtual Reality Systems: Quantifying the Timing and Positioning Accuracy", Proceedings of the 24th ACM International Conference on Multimedia, Amsterdam, Netherlands, Oct. 15-19, 2016, pp. 655-659.
(Continued)

*Primary Examiner* — John R Schnurr
(74) *Attorney, Agent, or Firm* — Condo Roccia Koptiw LLP

(57) ABSTRACT

A method for receiving and displaying media content may be provided. The method may include requesting a set of DASH video segments that are associated with various viewports and qualities. The method may include displaying the DASH video segments. The method may indue determining a latency metric based on a time difference between the display of a DASH video segment and one of: a device beginning to move, the device ceasing to move, the device
(Continued)

determining that the device has begun to move, the device determining that the device has stopped moving, or the display of a different DASH video segment. The different DASH video segment may be associated with one or more of a different quality or a different viewport.

20 Claims, 20 Drawing Sheets

Related U.S. Application Data filed on Jun. 26, 2017, provisional application No. 62/636,795, filed on Feb. 28, 2018.

(51) Int. Cl.
*H04N 21/2343* (2011.01)
*H04N 21/4728* (2011.01)

(58) Field of Classification Search
CPC .... H04N 13/344; H04N 19/87; H04N 19/597; H04N 21/8456; G06F 1/163; G06F 3/012; G06F 3/0304; G06F 3/011; H04L 65/80; H04L 65/4084

See application file for complete search history.

(56) References Cited

U.S. PATENT DOCUMENTS

| | | | |
|---|---|---|---|
| 2013/0282917 | A1 | 10/2013 | Reznik et al. |
| 2016/0352791 | A1 | 12/2016 | Adams et al. |
| 2018/0241966 | A1 | 8/2018 | Reznik et al. |
| 2019/0230388 | A1* | 7/2019 | Di ................... H04N 21/23439 |
| 2019/0238609 | A1* | 8/2019 | Skupin ............. H04N 21/23439 |

FOREIGN PATENT DOCUMENTS

| | | | | |
|---|---|---|---|---|
| CN | 105532008 | A | | 4/2016 |
| EP | 16193601 | * | 10/2016 | ........... H04L 65/602 |
| GB | 2523554 | A | | 9/2015 |
| JP | 2015-518350 | A | | 6/2015 |
| JP | 2016-165105 | A | | 9/2016 |
| JP | 2016-167699 | A | | 9/2016 |
| KR | 10-2015-0004394 | A | | 1/2015 |
| KR | 10-2017-0123656 | A | | 11/2017 |
| WO | 2016/191694 | A1 | | 12/2016 |
| WO | 2018/049221 | A1 | | 3/2018 |

OTHER PUBLICATIONS

Corbillon et al., "Viewport-Adaptive Navigable 360-Degree Video Delivery", Telecom Bretagne, France, Sep. 26, 2016, 7 pages.

Facebook, "Next-Generation Video Encoding Techniques for 360 Video and VR", Available at https://code.facebook.com/posts/1126354007399553/next-generation-video-encoding-techniques-for-360-video-and-vr/ , Jan. 21, 2016, pp. 1-6.

Facebook, "The Technology Behind 360 Video", Facebook for developers, Available at https://developers.facebook.com/videos/f8-2016/the-technology-behind-360-video/ , Apr. 13, 2016, pp. 1-2.

Fielding et al., "Hypertext Transfer Protocol (HTTP/1.1): Semantics and Content", Request for Comments: 7231, Category: Standards Track, ISSN: 2070-1721, Jun. 2014, 101 pages.

He et al., "MPEG-I Architecture: VR Experience Metrics", ISO/IEC JTC1/SC29/WG 11 MPEG 2017/m41120, Turin, Italy, Jul. 2017, 13 pages.

ISO/IEC, "Information Technology—Dynamic Adaptive Streaming over HTTP (DASH)—Part 1: Media Presentation Description and Segment Formats", ISO/IEC 23009-1:2014, 2nd Edition, May 15, 2014, 152 pages.

Kurutepe et al., "Client-Driven Selective Streaming of Multiview Video for Interactive 3DTV", IEEE Transactions on Circuits and Systems for Video Technology, vol. 17, No. 11, Nov. 2007, pp. 1558-1565.

ISO/IEC, "Information Technology—Coding of Audio Visual Objects—Part 12: ISO Base Media File Format", 14496-12:2015(E), Dec. 15, 2015, 248 pages.

ISO/IEC, "Dynamic Adaptive Streaming over HTTP (DASH), Part 5: Server and Network Assisted DASH (SAND)", ISO/IEC FDIS 23009-5:2015(E), N15991, Nov. 2015, 56 pages.

ISO/IEC, "Information Technology—Coded Representation of Immersive Media (MPEG-1)—Part 2:Omnidirectional Media Format", ISO/IEC JTC1/SC29/WG11 FDIS 23090-2 :201x (E), N17399, Feb. 2018, 181 pages.

ISO/IEC, "Generic Coding of Moving Pictures and Associated Audio Information—Part 1: Systems", ISO/IEC 13818-1, 2018, 304 pages.

ISO/IEC, "MPEG-DASH: The Standard for Multimedia Streaming Over Internet", ISO/IEC W13533, Apr. 2012, 6 pages.

MPEG, "ISOBMFF and DASH Carriage of Initial VR Rendering Orientation", m39235, Nokia Contribution, MPEG 116, Oct. 2016, 4 pages.

MPEG, "Signalling for Data Prefetching in DASH", m39981, Qualcomm Contribution, MPEG 117, Jan. 2017, 3 pages.

Sanchez et al., "DASH-VR Architecture", ISO/IEC JTC1/SC29/WG11, MPEG116/m39279, Chengdu, China, Oct. 2016, 3 pages.

Sanchez et al., "RoI Signaling for DASH", ISO/IEC JTC1/SC29/WG11, MPEG115/m38638, Geneva, Switzerland, May 2016, 2 pages.

Wang et al., "Signalling of Most-Interested Regions of VR Video", m38559, Qualcomm Contribution, MPEG 115, May 2016, 3 pages.

* cited by examiner

METRICS AND MESSAGES TO IMPROVE EXPERIENCE FOR 360-DEGREE ADAPTIVE STREAMING

CROSS-REFERENCE TO RELATED APPLICATIONS

This application is the National Stage Entry under 35 U.S.C. § 371 of Patent Cooperation Treaty Application No. PCT/US2018/023971, filed Mar. 23, 2018, which claims the benefit of U.S. Provisional Patent Application No. 62/475,563, filed Mar. 23, 2017, U.S. Provisional Patent Application No. 62/525,065, filed Jun. 26, 2017, U.S. Provisional Patent Application No. 62/636,795, filed Feb. 28, 2018, the contents of which are incorporated by reference.

BACKGROUND

360° video is a rapidly growing format emerging in the media industry. 360° video is enabled by the growing availability of virtual reality (VR) devices. 360° video may provide the viewer a new sense of presence. When compared to rectilinear video (e.g., 2D or 3D), 360° video may pose difficult engineering challenges on video processing and/or delivery. Enabling comfort and/or an immersive user experience may require high video quality and/or very low latency. The large video size of 360° video may be an impediment to delivering the 360° video in a quality manner at scale.

360° video applications and/or services may encode the entire 360° video into a standard compliant stream for progressive downloading and/or adaptive streaming. Delivering the entire 360° video to the clients may enable low-latency rendering (e.g., the client may have access to the entirety of the 360° video content and/or can choose to render the portion it desires to see without further constraint). From the server's perspective, the same streams can support multiple users with possibly different viewports. The video size may be tremendously high, incurring high transmission bandwidth when the video is delivered (e.g., because the entire 360° video may be encoded in high quality, such as 4K@60 fps or 6K@90 fps per eye). The high bandwidth consumption during delivery may be wasted, for example, because the user may only view a small portion (e.g., a viewport) of the entire picture.

SUMMARY

Systems, methods, and instrumentalities may be provided for exchanging information between streaming client(s), content origin server(s), measurement/analytics server(s) and/or other video streaming assisting network elements.

For example, streaming clients may generate and report the metrics they support in a consistent fashion, and various network elements may generate and send streaming assisting messages to the streaming clients or to each other. Performance across different clients, players, devices and networks may be monitored and compared. Issues may be debugged and fault(s) may be isolated in real time or offline.

For example, viewport view statistics may be reported from the clients to the metrics server via server and network assisted dynamic adaptive streaming over hypertext transfer protocol (SAND) message(s). Information related to the VR device may be reported. One or more latency parameters, such as viewport switching latency, initial latency and settling latency may be measured and reported by the streaming client. The precision and sensitivity of the head mounted device(s) (HMD) may be measured and exchanged among the network elements such as the origin server, content delivery network servers, and client or metrics server. The initial rendering orientation information may be sent to the VR device via the SAND message(s).

While the systems, methods, and instrumentalities are described herein using dynamic adaptive streaming over hypertext transfer protocol (DASH) terminologies, those skilled in the art would appreciate that they apply to other streaming standards and implementations.

A device for receiving and displaying media content may display a first viewport. The first viewport may be made up of at least a portion of one or more dynamic adaptive streaming over HTTP (DASH) video segments. The first viewport may have a first quality. The device may determine a movement of the device at a first time. The movement of the device may include one or more of the device's movement outside of the first viewport, an orientation change of the device, or a zooming operation. The device may detect the movement of the device when a change of one or more viewport switching parameters is equal or greater than a threshold. The viewport switching parameters may include, for example, one or more of centre_azimuth, centre_elevation, centre_tilt, azimuth_range, and elevation_range.

The device may display the second viewport. The second viewport may be made up of at least a portion of one or more DASH video segments at a second time. The second viewport may have a second quality that is less than the first quality. Alternatively, the second viewport may have a second quality that is equal or greater than the first quality. The device may determine a viewport switching latency metric based on the first time and the second time and send the viewport switching latency metric.

The device may display the third viewport. The third viewport may be made up of at least a portion of one or more DASH video segments at a third time. The third viewport may have a third quality that is greater than second quality. The third quality may be equal to or greater than the first quality, or the third quality may be equal to or greater than a quality threshold but less than the first quality. In an example, the absolute difference between the first quality and the third quality may be equal to or less than a quality threshold. Each DASH video segment may have a respective quality. The device may determine the first, second, or third quality based on a relative portion and respective quality of the one or more DASH video segments that are used to make up the respective viewport. For example, the device may determine the quality of a viewport using an average, a maximum, a minimum, or a weighted average of the respective quality of each of the one or more DASH video segments that are used to make up the viewport. The device may determine a quality viewport switching latency metric based on a difference between the first time and the third time and sending the quality viewport switching latency metric.

The device may determine a viewport loss and whether the viewport loss affects at least one of the displayed first viewport, second viewport, or third viewport. The device may determine information associated with the viewport loss, for example, based on a condition that the viewport loss affects at least one of the displayed first viewport, second viewport, or third viewport. The information associated with the viewport loss may include a reason for the viewport loss and a DASH video segment associated with the viewport loss. The device may send a viewport loss metric that indicates the information associated with the viewport loss. The information associated with the viewport loss may include one or more of a time when the viewport loss is determined, a source URL of a packet, and an error type of the viewport loss. The reason for the viewport loss may include one of a server error, a client error, a packet loss, a packet error, or a packet discard.

A device may request a set of DASH video segments that are associated with various viewports and qualities. The device may display the DASH video segments. The device may determine a latency metric based on a time difference between the display of a DASH video segment and one of: a device beginning to move, the device ceasing to move, the device determining that the device has begun to move, the device determining that the device has stopped moving, or the display of a different DASH video segment. The different DASH video segment may be associated with a different quality and/or a different viewport.

A device for receiving and displaying media content may display a first viewport at a first time. The first viewport may include at least a portion of one or more DASH video segments. The first viewport may have a first quality. The device may detect a movement of the device at a second time. The device may determine that the device has stopped moving at a third time when the device is associated with a second viewport. The device may display the second viewport at a fourth time. The second viewport may include at least a portion of one or more DASH video segments. The second viewport may be associated with a second quality. The device may display a third viewport at a fifth time. The third viewport may include at least a portion of one or more DASH video segments. The third viewport may be associated with a third quality that is greater than the second quality. The third quality may be equal to or greater than the first quality, or the third quality may be greater than a quality threshold but less than the first quality. The device determine and send a latency metric based on a time difference between two or more of the first, second, third, fourth, and fifth times.

BRIEF DESCRIPTION OF THE DRAWINGS

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

Figure 1A:
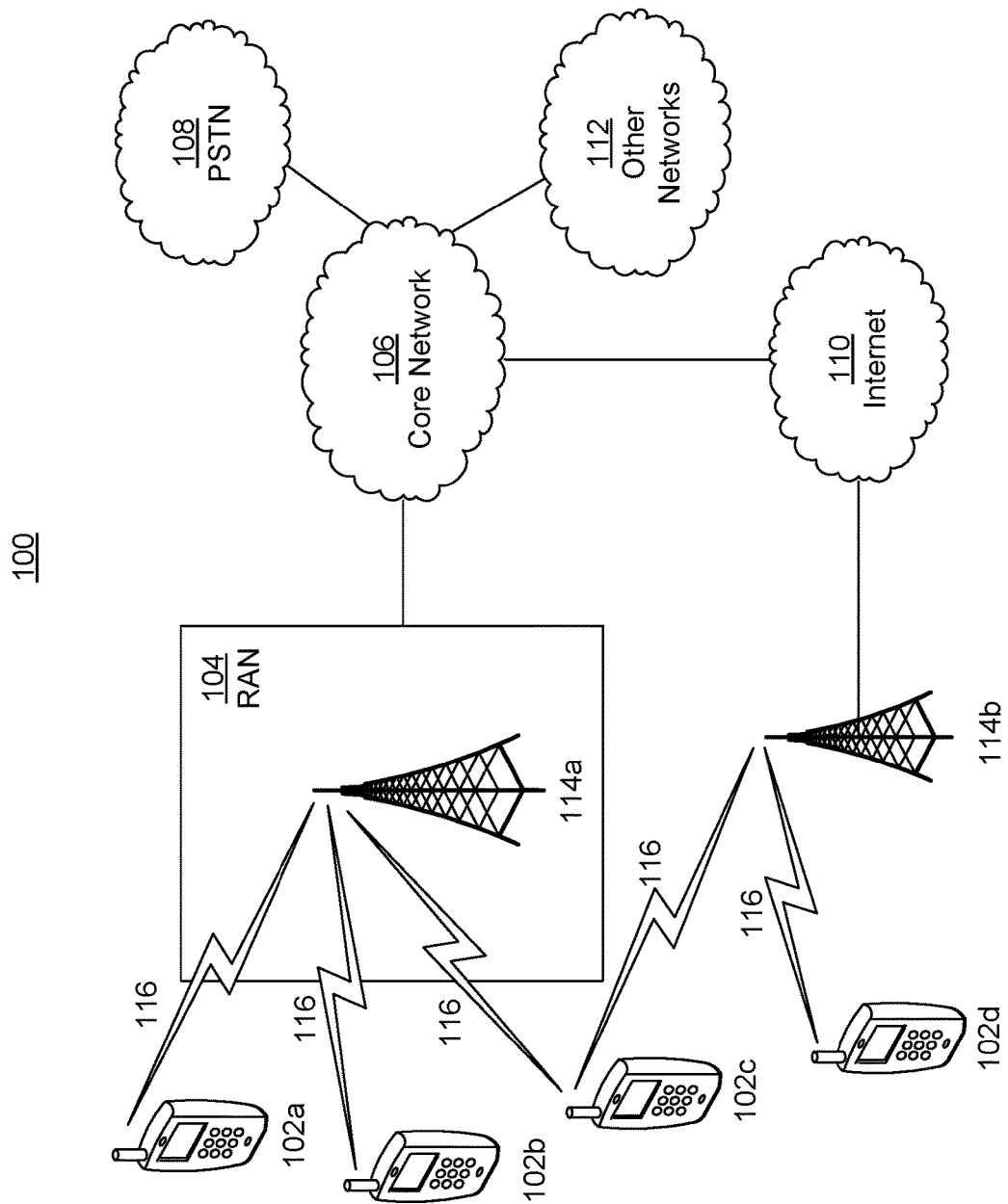
FIG. 1A is a system diagram illustrating an example communications system in which one or more disclosed embodiments may be implemented.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
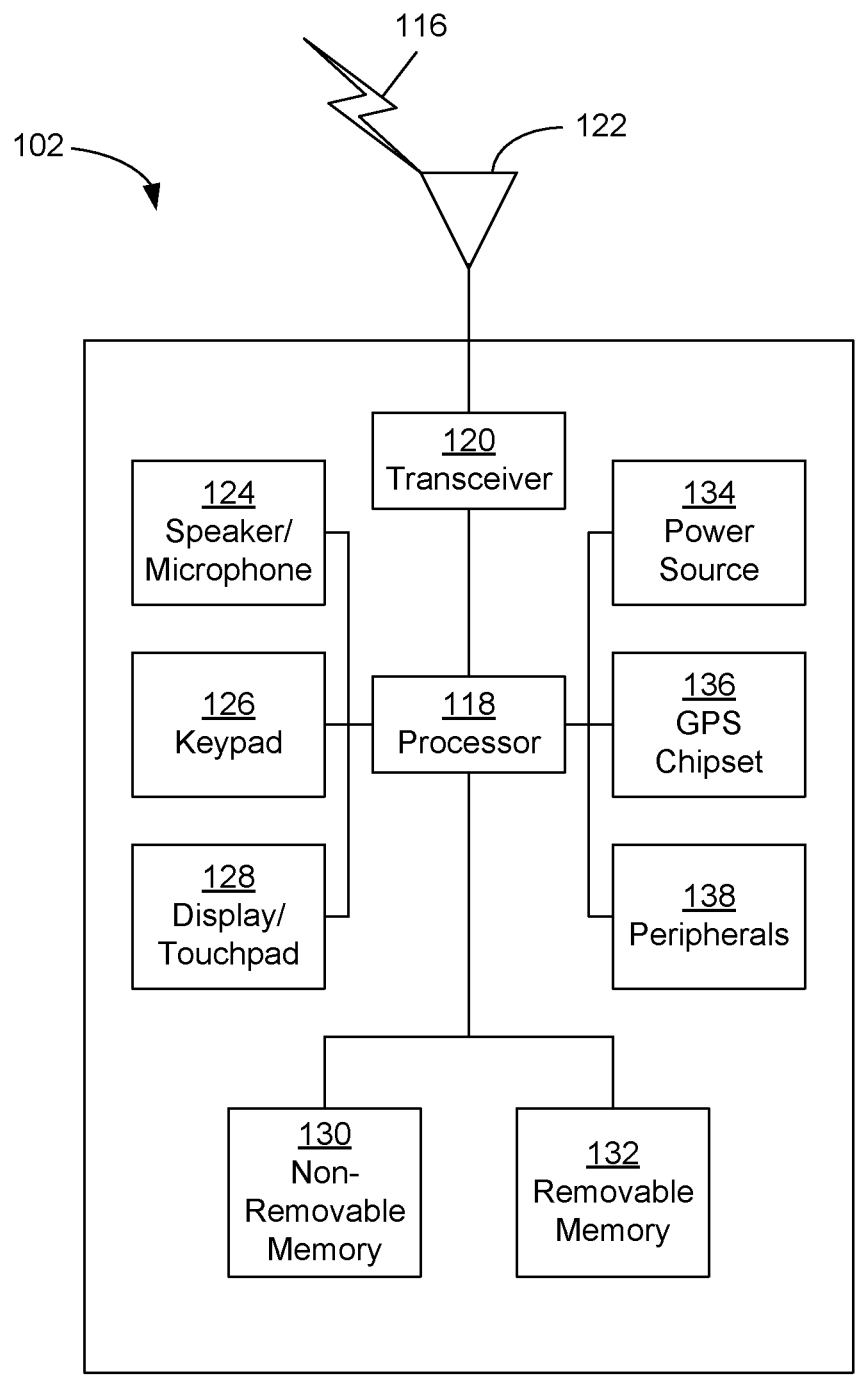
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
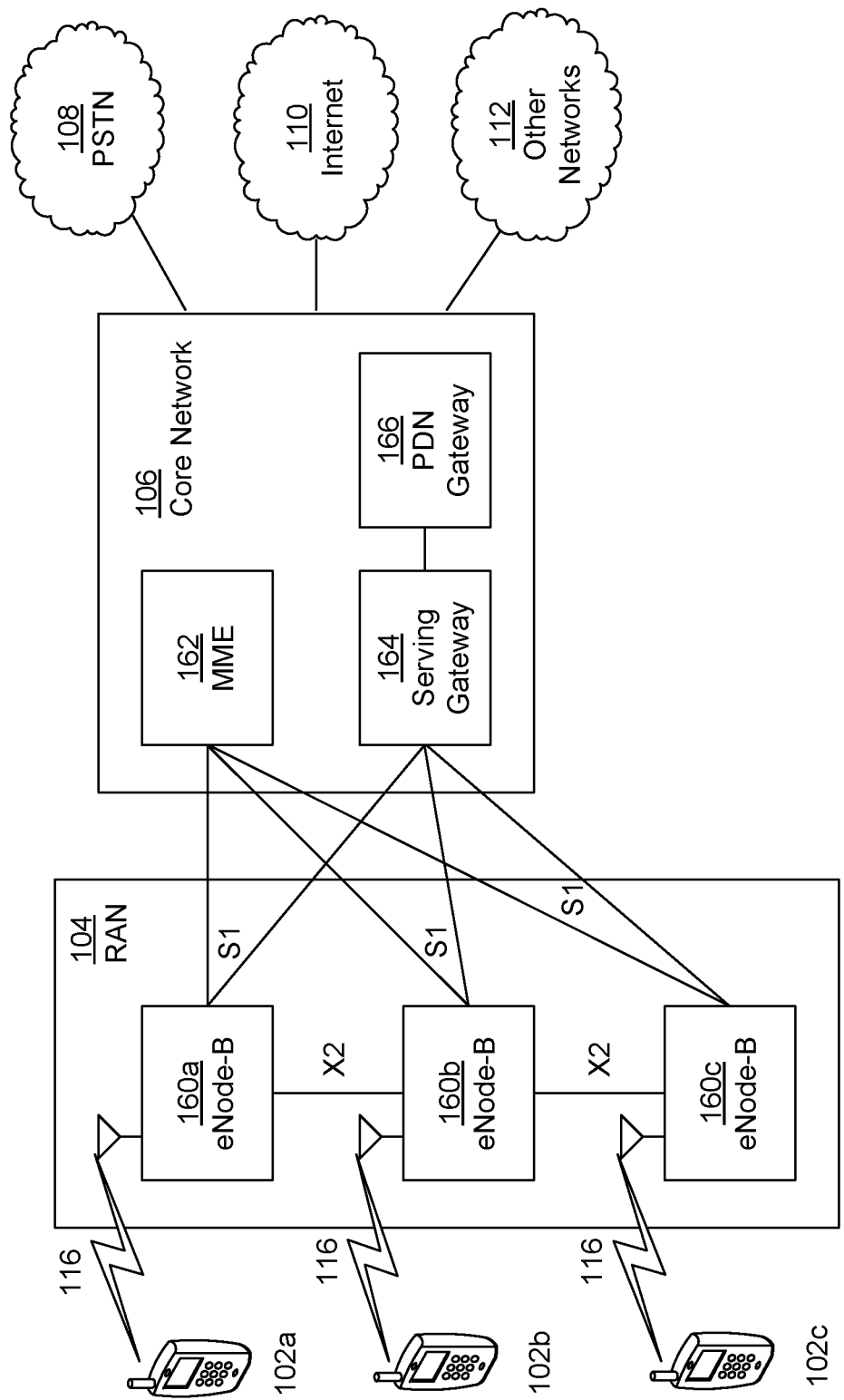
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
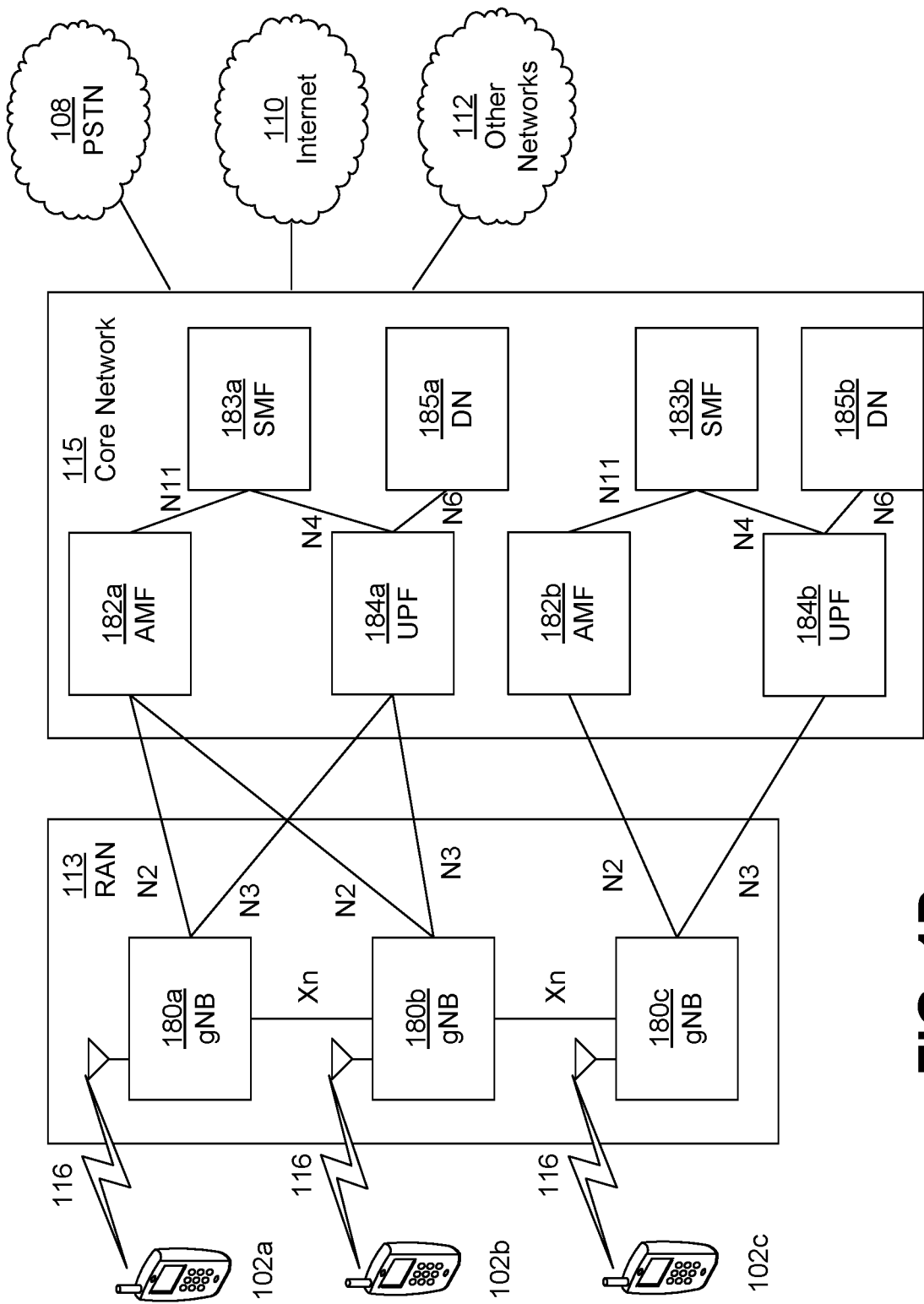
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
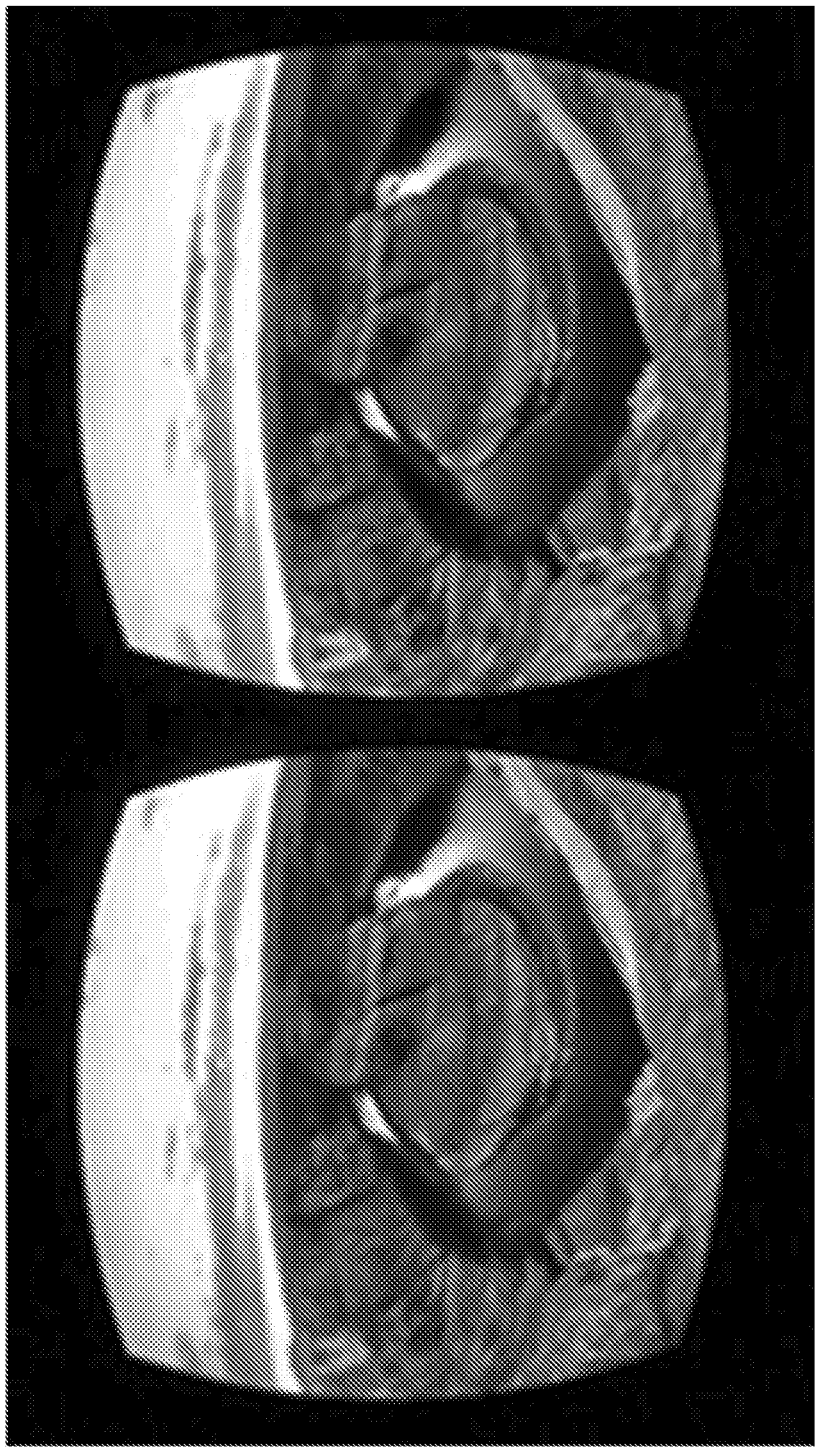
FIG. 2 depicts an example portion of 360° video displayed on a head mounted device (HMD).

FIG. 2 depicts an example portion of 360° video displayed on a head mounted device (HMD). When viewing a 360° video, a user may be presented with a part of the video, for example, as shown in FIG. 2. The part of the video may be changed when the user looks around and/or zooms an image of the video. The part of the video may be changed based on feedback provided by the HMD and/or other types of user interfaces (e.g., a wireless transmit/receive unit (WTRU)). A spatial region of the entire 360° video may be called a viewport. The viewport may be fully or partially presented to the user. The viewport may have one or more different qualities than other parts of the 360° video.

Figure 3:
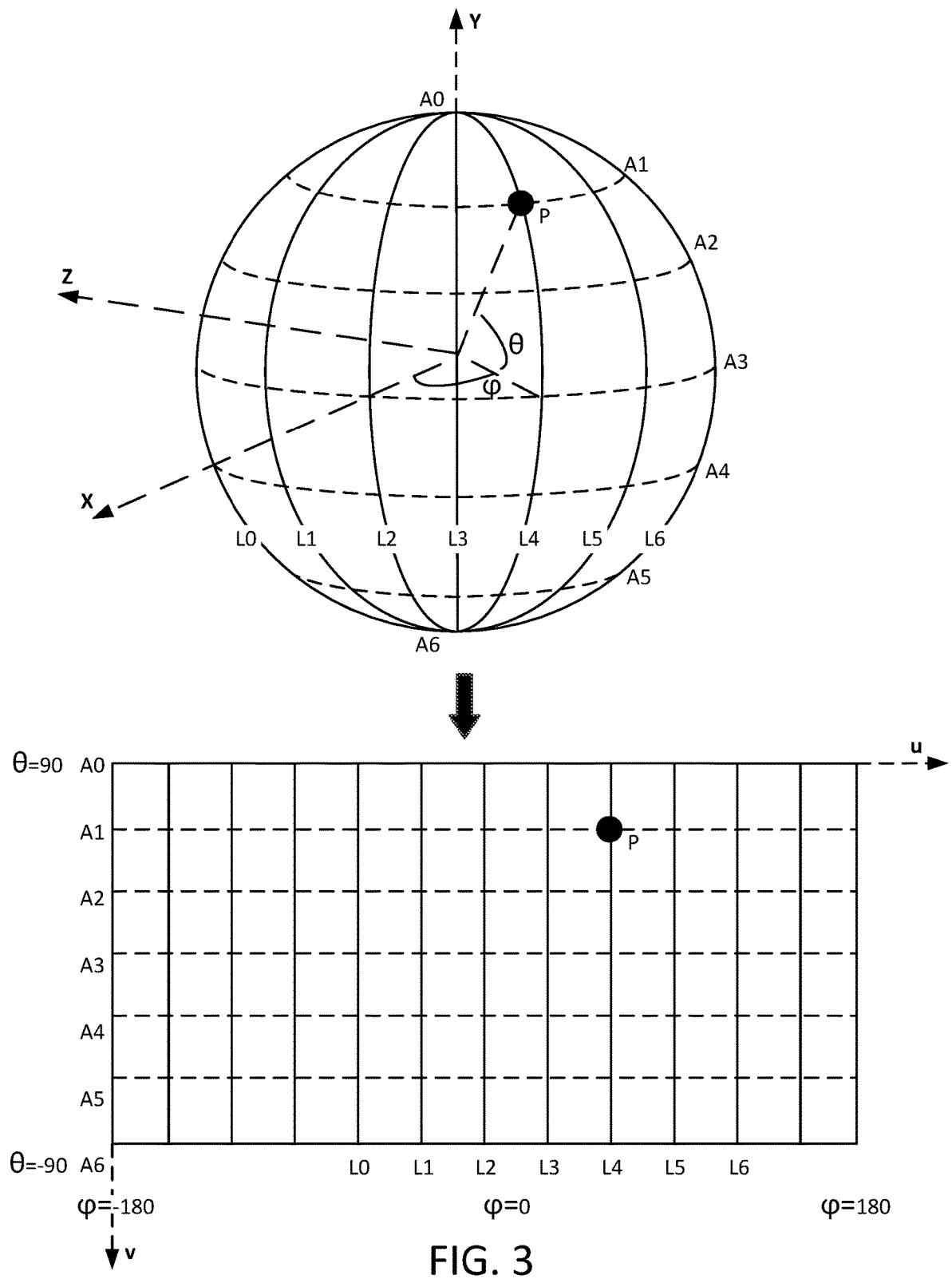
FIG. 3 depicts an example equirectangular projection for a 360° video.
Figure 4:
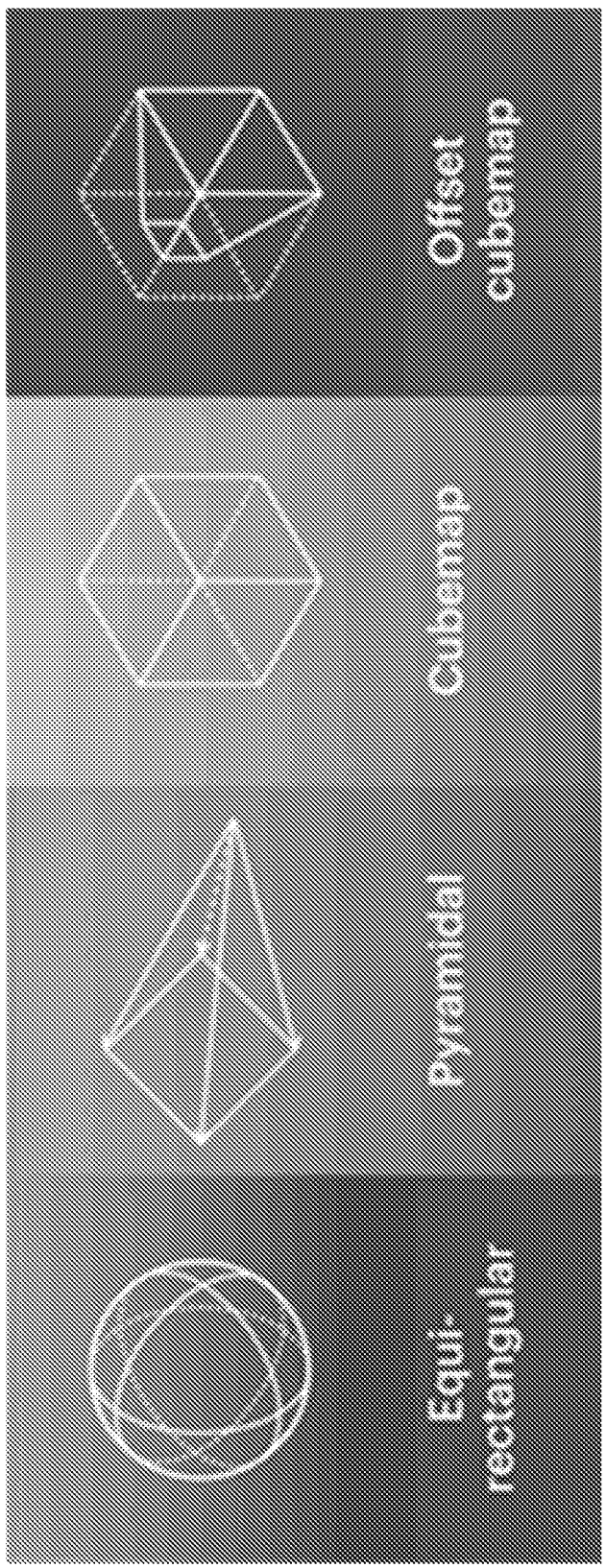
FIG. 4 depicts example 360° video mappings.

A 360° video may be captured and/or rendered on a sphere (e.g., to give the user the ability to choose an arbitrary viewport). A spherical video format may not be delivered directly using conventional video codecs. A 360° video (e.g., such as a spherical video) may be compressed by projecting a spherical video onto a 2D plane using a projection method. The projected 2D video may be coded (e.g., using conventional video codecs). An example of the projection method may include an equirectangular projection. FIG. 3 depicts an example equirectangular projection for a 360° video. For example, an equirectangular projection method may use one or more of the following equations to map a first point P with coordinate ($\theta$, $\varphi$) on a sphere to a second point P with coordinate (u, v) on a 2D plane, $$u = \varphi/(2*pi) + 0.5 \qquad \text{Eq. 1}$$

$$v = 0.5\theta/(pi) \qquad \text{Eq. 2}$$

FIG. 3 depicts an example(s) of 360° video mappings. For example, one or more other projection methods (e.g., mappings) may be used to convert 360 video to 2D planar video (e.g., in order to reduce bandwidth requirements, alternative). For example, the one or more other projection methods may include a pyramid-map, a cube-map, and/or an offset cube-map. The one or more other projection methods may be used to represent the spherical video with less data. For example, the cube-map projection method may use 20% less pixels compared to the equirectangular projection (e.g., because the cube-map projection may introduce less warping). The one or more other projection methods, such as pyramid projection, may subsample one or more pixels that the viewer is not likely to watch (e.g., to reduce size of the projected 2D video).

A viewport-specific representation may be used as an alternative to storing and/or delivering the entire 360 video between server and client. One or more of the projection methods shown in FIG. 3, for example, the cube-map and/or pyramidal projection, may provide uneven quality representations for different viewports (e.g., some viewports may be represented in a higher quality than other viewports). Multiple versions of the same video with different target viewports may need to be generated and/or stored at the server side (e.g., to support all viewports of the spherical video). For example, in Facebook's implementation of VR video delivery, the offset cube-map format shown in FIG. 3 may be used. The offset cube-map may provide a highest resolution (e.g., highest quality) to the front viewport, a lowest resolution (e.g., lowest quality) to the back view, and an intermediate resolution (e.g., intermediate quality) to one or more side views. A server may store multiple versions of the same content (e.g., to accommodate a client request for different viewports of the same content). For example, a total of 150 different versions (e.g., 30 viewports times 5 resolutions for each viewport) of the same content. During delivery (for example, streaming), the client may request a specific version that corresponds to the client's current viewport. The specific version may be delivered by the server. The client requesting a specific version that corresponds to the client's current viewport may save transmission bandwidth, may include increased storage requirements on the server, and/or potentially increase latency if/when the client changes from a first viewport to a second viewport. The latency problem may be severe when such viewport changes are frequent.

A client device may receive a video stream encoded according to an Omnidirectional Media Format (OMAF). A sub-picture may be a picture that represents a spatial subset of an original content. A sub-picture bitstream may be a bitstream representing a spatial subset of the original content. The viewing orientation may be a triple of azimuth, elevation, and tilt angle characterizing the orientation in which a user is consuming the audio-visual content. The viewport may be the region of the omnidirectional image(s) and/or video(s) suitable for display and viewing by the user. The viewpoint may be the center point of a viewport. The content coverage may include one or more sphere regions that are covered by the content represented by a track or by an image item.

OMAF may specify viewport independent video profile and viewport dependent video profile. For viewport independent video streaming, 360 video pictures may be encoded as a single-layer bitstream. An entire coded bitstream may be stored at a server, and if needed, fully transmitted to the OMAF player and fully decoded by the decoder. The area of the decoded picture corresponding to the current viewport may be rendered to the user. For viewport dependent video streaming, one or a combination of video streaming approaches may be utilized. An OMAF player may receive a video encoded according to a single-layer stream based approach. In the single-layer stream based approach, multiple single-layer streams may be generated. For example, each stream may contain the whole omnidirectional video, but each stream may be with a different high quality encoded region as indicated by region-wise quality ranking (RWQR) metadata. Depending on the current viewport, the stream that contains a high quality encoded region matching that of the current viewport location may be selected and/or transmitted to the OMAF player.

An OMAF player may receive a video that is encoded according to a sub-picture stream based approach. In the sub-picture stream based approach, the 360 video may be split into sub-picture sequences. A (e.g., each) sub-picture sequence may cover a subset of the spatial area of the omnidirectional video content. A (e.g., each) sub-picture sequence may be encoded independently from each other as a single-layer bitstream. The OMAF player may select the sub-picture(s) to be streamed, for example, based on the orientation/viewport metadata of the OMAF player. A better quality or higher resolution stream may be received, decoded, and/or rendered for the current viewport compared to the quality or resolution covering the remaining, currently non-rendered areas, indicated by region-wise quality ranking (RWQR) metadata.

HTTP streaming has become a dominant approach in commercial deployments. For instance, streaming platforms such as Apple's HTTP Live Streaming (HLS), Microsoft's Smooth Streaming (SS), and/or Adobe's HTTP Dynamic Streaming (HDS) may use HTTP streaming as an underlying delivery method. A standard for HTTP streaming of multimedia content may enable a standard-based client to stream content from any standard-based server (e.g., thereby enabling interoperability between servers and clients of different vendors). MPEG Dynamic Adaptive Streaming over HTTP (MPEG-DASH) may be a universal delivery format that provides end users with the best possible video experience by dynamically adapting to changing network conditions. DASH may be built on top of the HTTP/TCP/IP stack. DASH may define a manifest format, Media Presentation Description (MPD), and segment formats for ISO Base Media File Format and MPEG-2 Transport Streams.

Dynamic HTTP streaming may require various bitrate alternatives of multimedia content to be available at the server. The multimedia content may include several media components (e.g., audio, video, text), some or all of which may have different characteristics. In MPEG-DASH, the characteristics may be described by a MPD.

Figure 5:
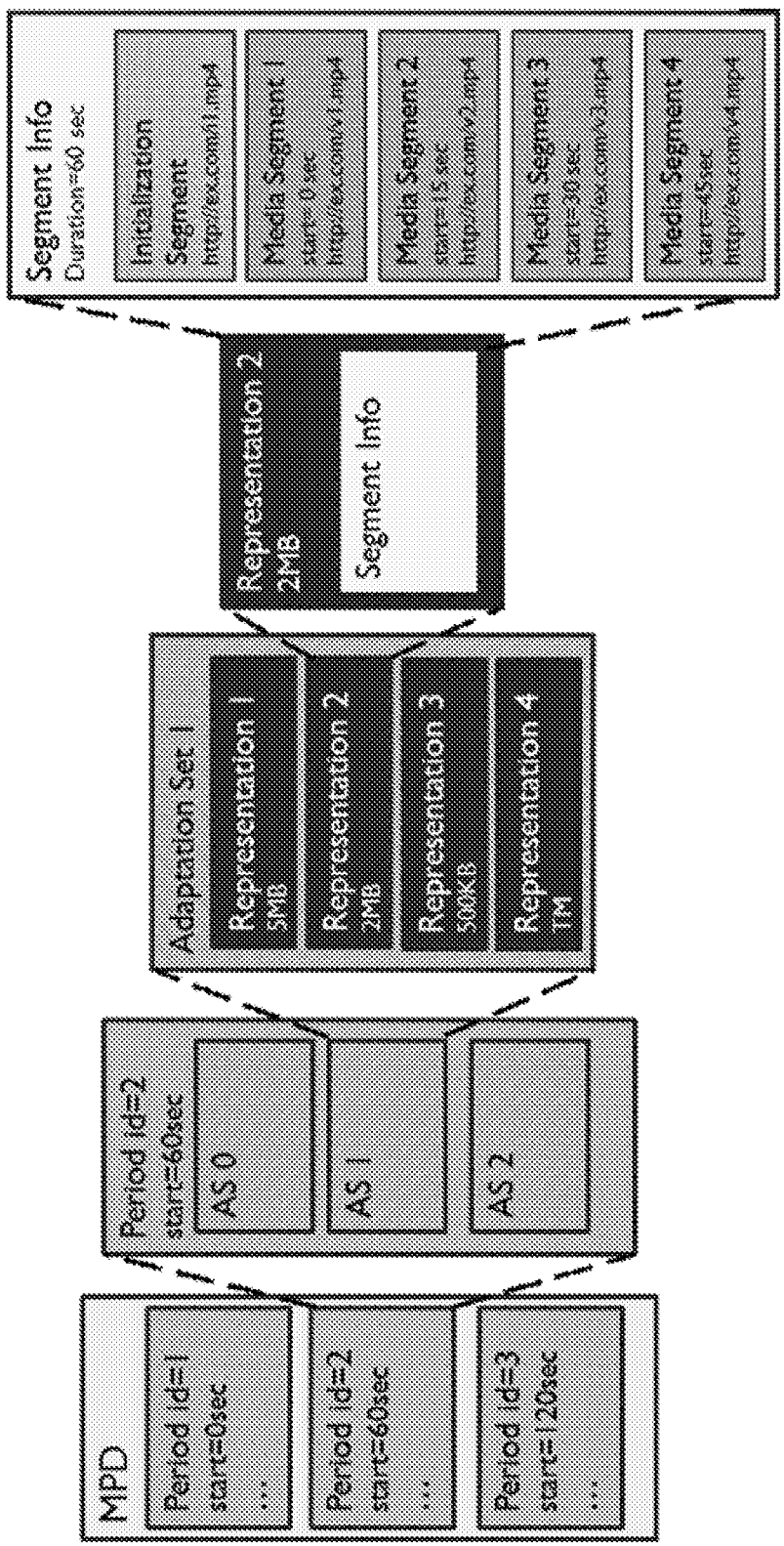
FIG. 5 depicts an example media presentation description (MPD) hierarchical data model.

The MPD may be an XML document that includes metadata necessary for a DASH client to construct appropriate HTTP-URLs to access video segments (e.g., as described herein) in an adaptive manner during streaming sessions. FIG. 5 depicts an example MPD hierarchical data model. The MPD may describe a sequence of Periods, where a consistent set of encoded versions of the media content components does not change during a Period. A (e.g., each) period may have a starting time and duration. A (e.g., each) period may be composed of one or more adaptation sets (e.g., AdaptationSet). A DASH streaming client may be a WTRU as described herein with respect to FIGS. 8A-8E.

An AdaptationSet may represent a set of encoded versions of one or several media content components sharing one or more identical properties (e.g., such as the language, the media type, the picture aspect ratio, the role, the accessibility, the viewpoint, and/or the rating property). For instance, a first AdaptationSet may include different bitrates of the video component of the same multimedia content. A second AdaptationSet may include different bitrates of the audio component (e.g., lower quality stereo and/or higher quality surround sound) of the same multimedia content. An (e.g., each) AdaptationSet may include multiple Representations.

A Representation may describe a deliverable encoded version of one or several media components, varying from other representations by bitrate, resolution, number of channels, and/or other characteristics. A (e.g., each) representation may include one or more segments. One or more attributes of a Representation element (e.g., such as @id, @bandwidth, @qualityRanking, and @dependencyId) may be used to specify one or more properties of the associated Representation.

A Segment may be the largest unit of data that can be retrieved with a single HTTP request. A (e.g., each) segment may have a URL (e.g., an addressable location on a server). A (e.g., each) segment may be downloaded using HTTP GET or HTTP GET with byte ranges.

A DASH client may parse a MPD XML document. The DASH client may select a collection of AdaptationSets suitable for the DASH client's environment, for example, based on information provided in one or more of the AdaptationSet elements. Within a (e.g., each) AdaptationSet, the client may select a Representation. The client may select the Representation based on the value of @bandwidth attribute, client decoding capabilities, and/or client rendering capabilities. The client may download an initialization segment of the selected Representation. The client may access content (e.g., by requesting entire Segments or byte ranges of Segments). When the presentation has started, the client may continue consuming the media content. For example, the client may request (e.g., continuously request) Media Segments and/or parts of Media Segments during the presentation. The client may play content according to a media presentation timeline. The client may switch from a first Representation to a second representation, based on updated information from the client's environment. The client may play the content continuously across two or more Periods. When the client consumes media contained in the Segments towards the end of the announced media in the Representation, the Media Presentation may be terminated, a Period may be started, and/or the MPD may be (e.g., need to be) re-fetched.

Figure 6:
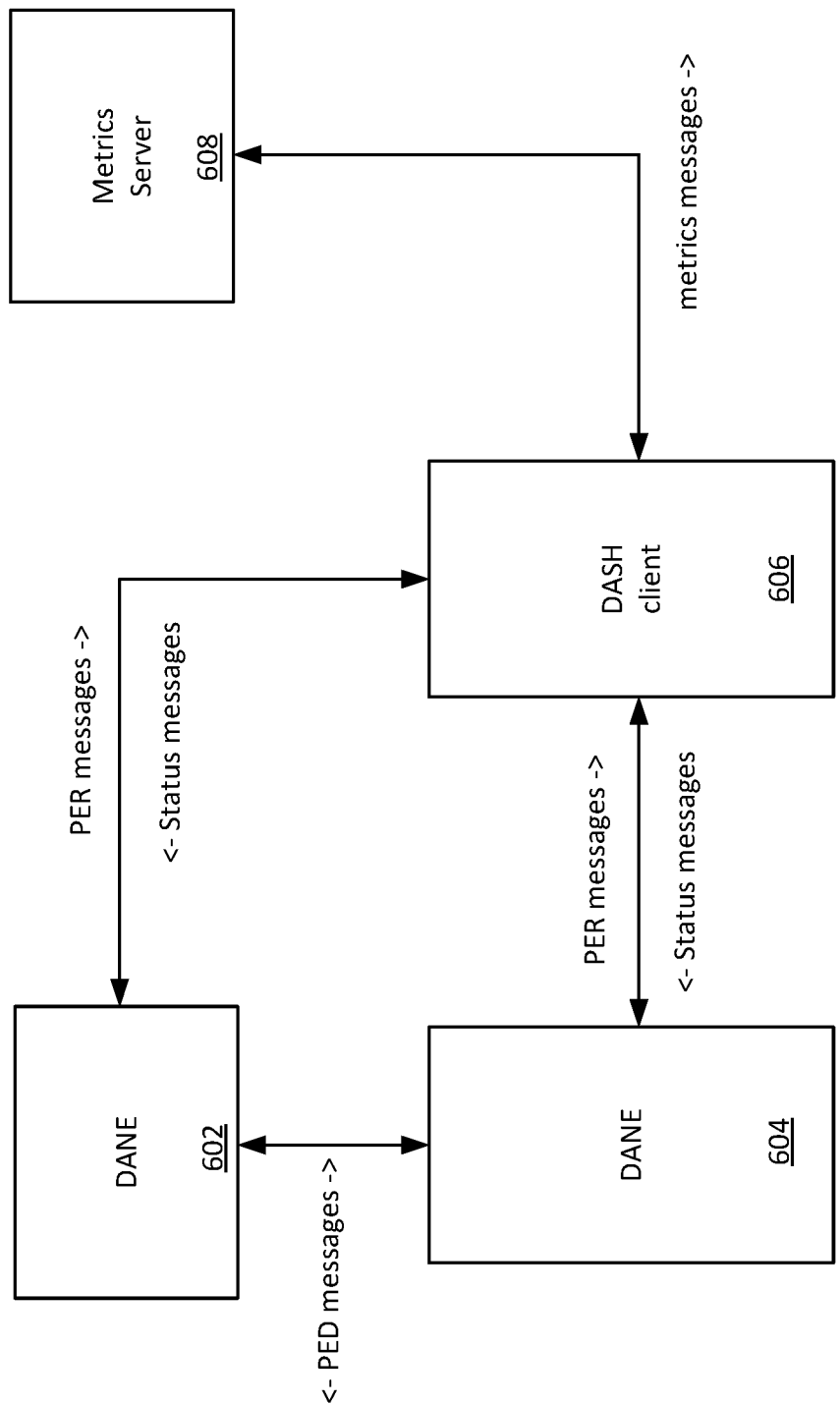
FIG. 6 shows an example of SAND messages exchanged between network elements and client.

Messages between streaming clients such as DASH clients and network elements or between various network elements may provide information about real-time operational characteristics of networks, servers, proxies, caches, CDNs as well as DASH client's performance and status. FIG. 6 shows an example of server and network assisted DASH (SAND) messages exchanged between network elements and a client (s). As shown, parameters enhancing delivery (PED) messages may be exchanged between DASH aware network elements (e.g., 602 or 604) or DASH assisting network elements (DANE) (e.g., 602 or 604). Parameters enhancing reception (PER) messages may be sent from DANE(s) 602 and 604 to DASH clients 606. Status messages may be sent from the DASH client(s) 606 to the DANE(s) 602 and 604. A status message may provide real-time feedback from the DASH client 606 to DANE(s) 602 and 604 to support real-time operations. Metrics messages may be sent from DASH client(s) 606 to a metrics server 608. The metrics message may provide a summary of the session or longer time intervals.

DASH clients may generate and report the metrics they support in a consistent fashion. Performance across different clients, players, devices and networks may be monitored and compared. Issues may be debugged and fault(s) may be isolated in real time or offline. The entities that may generate, report, process and visualize the metrics may have a common understanding of the information contained in the messages, metrics and reports.

Some DASH metrics can be used in DASH clients streaming omnidirectional media the same way they are used in clients streaming traditional media. Omnidirectional media may be associated with higher bitrate requirements, higher rendering delays and higher sensitivity to latency. Certain metrics may be used for DASH clients streaming this media type. For DASH entities that support SAND, specific PED/PER messages may be used.

A VR device may measure its precision and sensitivity. The VR device may include a HMD(s). The initial rendering orientation information may be sent to the VR device. Viewport view statistics may be reported, e.g., by the VR device. A region of interest (ROI) may be signaled in file format level. ROI may be signaled as events to be carried with a (e.g., each) segment. Signaling for prefetching data in a DANE element may be at the MPD level along with supplementary PED messages. ROI information may be carried in a timed metadata track or in an event stream element.

A VR metrics client reference model may be used with different types of information exchanged between one or more of the streaming client, origin server, or measurement/analytics server and other DANEs, for example, as described in FIG. 6.

Semantics may be defined using an abstract syntax. Items in the abstract syntax may have one or more primitive types including integer, real, boolean, enum, string, vector, and/or the like. Items in the abstract syntax may have one or more compound types. The compound types may include objects, list, and/or the like. Objects may include an unordered sequence of key and/or value pairs. The key may have a string type. The key may be unique within the sequence. List may include an ordered list of items. Multiple (e.g., two) kinds of timestamp may be used or defined. The kinds of timestamp may include real time (e.g., wall-clock time) with type Real-Time and/or media time with type Media-Time.

Figure 7:
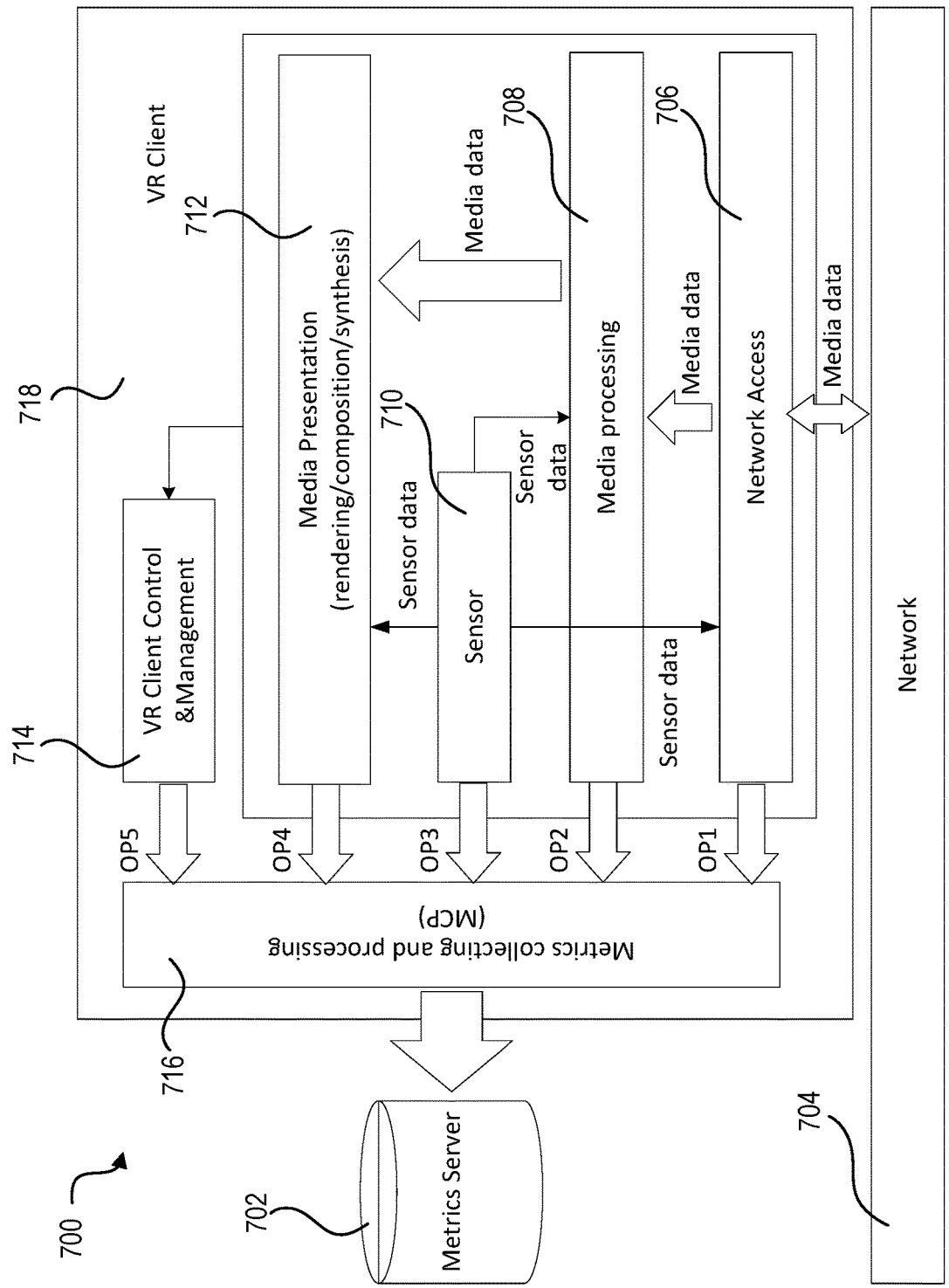
FIG. 7 shows an example of a VR metrics client reference model.

A VR-Metrics client reference model may be used for metrics collection and/or processing. The VR-Metrics client reference model may use or define one or more observation points (OPs) for metrics collection and processing. FIG. 7 may be an example of a VR metrics client reference model. A VR device may include the VR client 718. The VR device or a VR player may be used based on the VR metrics client reference model 700.

FIG. 7 may show functional elements of the VR metrics client reference model 700. The functional elements may include one or more of network access 706, media processing 708, sensor 710, media presentation 712, VR client control & management 714, or metrics collection and processing (MCP) 716. A VR application may communicate with different functional elements to deliver an immersive user experience. The network access 706 may request VR content from a network 704. The network access 706 may request one or more viewport segments of different qualities for viewport dependent streaming (e.g., based on dynamic sensor data). The media processing element 708 may decode a (e.g., each) media sample(s) and/or pass the decoded media sample(s) to the media presentation 712. The media presentation 712 may present the corresponding VR content via a device(s) (e.g., one or more of HMD(s), loudspeakers, or headphones).

The sensor 710 may detect a user's orientation and/or movement. The sensor 710 may generate sensor data, for example, based on the user's orientation and/or movement. The VR client 718 and/or the server may use the sensor data in various ways. For example, the sensor data may be used to determine viewport segments to be requested (e.g., specific high quality viewport segments). The sensor data may be used to determine a portion or which portions of the media samples (e.g., audio and video) to be present on the device (e.g., HMD(s) and/or headphones). The sensor data may be used to apply post-processing to match a media sample presentation with a user movement (e.g., the latest user movement).

The VR client control and/or management module 700 may configure the VR client 718 for a VR application. The VR client control and/or management module 700 may interact with some or all functional elements. The VR client control and/or management module 700 may manage a workflow. The workflow may include an end-to-end media process procedure. For example, the workflow may include, for the VR client 718, a process from receiving media data to the presentation of the media samples.

The MCP 716 may aggregate data, for example, from various observation points (OPs). The data may include one or more of user position, event time, media sample parameters, and/or the like. The MCP 716 may derive one or more metrics that are used by or sent to the metrics server 702. For example, viewport switching latency metric derivation may be based on input data from OP3 (e.g., motion trigger time) and/or OP4 (e.g., viewport display update time).

The metrics server 702 may collect the data (e.g., metric data). The metrics server 702 may use the data for one or more of user behavior analysis, VR device performance comparison, or other debug or track purpose. The overall immersive VR experience may be enhanced across network, platforms and/or devices.

A VR service application (e.g., a CDN server, a content provider, and/or a cloud gaming session) may utilize the metrics collected by the metrics server 702 to deliver different levels of qualities and/or immersive experience services to the VR client (e.g., the VR device including the VR client 718), for example, based on the client capability and performance. For example, a VR cloud gaming server may examine the VR client's performance metrics including one or more end-to-end latency, tracking sensitivity and accuracy, field of view or the like. The VR cloud gaming server may determine whether the VR client 718 is able to provide an appropriate level of VR experience to the user. The VR cloud gaming server may authorize an access to a VR game to a qualified VR client(s). A qualified VR client(s) may be able to provide an appropriate level of VR experience to the user.

The VR cloud gaming server may not authorize an access to a VR game to an unqualified VR client(s). An unqualified VR client(s) may not be able to provide an appropriate level of VR experience to the user. For example, if a VR cloud gaming server determines that a client (e.g., the VR client 718) suffers relatively high end-to-end latency, and/or has insufficient tracking sensitivity parameters, the VR cloud gaming server may not allow the VR client to join a live VR gaming session. The VR cloud gaming server may grant a client (e.g., the VR client 718) a conventional gaming session. For example, the client may join the game only in a 2D version without the immersive experience. A VR cloud gaming server may monitor dynamic performance changes of the client. The VR cloud gaming server may switch to a lower quality VR game content or a less-immersive VR game when the VR metrics show performance downgrading on the fly. For example, if the VR cloud gaming server determines that a client's equal-quality viewport switching latency is relatively high, the VR cloud gaming server may deliver tiles (e.g., tiles with more similar qualities) to the client to reduce a quality discrepancy. The VR users' VR experience may be impacted by the network conditions. A content delivery network (CDN) or an edge server may push the VR content and/or service to a cache that is closer to the client (e.g., VR users).

The MCP 716 may aggregate data from various observation points (OPs) in various manners. Example OPs (OP1-OP5) are provided herein, but it should be appreciated that the MCP 716 may aggregate data, for example, from any order or combination of the OPs described herein. The MCP 716 may be part of the client or reside in a metrics server (e.g., the metric server 702).

OP1 may correspond to or include an interface from the network access 706 towards the MCP 716. The network access 706 may issue a network request(s), receive VR media stream, and/or decapsulate VR media stream from the network 704. The OP1 may include a set of network connections. A (e.g., each) network connection may be defined by one or more of a destination address, initiation, connect, or close times. The OP1 may include a sequence of transmitted network requests. A (e.g., each) transmitted network request(s) may be defined by one or more of a transmission time, contents, or a TCP connection on which the network request(s) is sent. The OP1 may include, for a (e.g., each) network response, one or more of reception time, contents of a response header, and/or a reception time of a (e.g., each) byte of a response body.

OP2 may correspond to or include an interface from the media processing 708 towards the MCP 716. The media processing 708 may carry out demux and/or decoding (e.g., audio, image, video and/or light field decoding). The OP2 may include encoded media samples. An (e.g., each) encoded media sample may include one or more of a media type, a media codec, media decoding time, omnidirectional media metadata, omnidirectional media projection, omnidirectional media region-wise packing, an omnidirection video viewport, frame packing, a color space, a dynamic range, or the like.

OP3 may correspond to an interface from the sensor 710 towards the MCP 716. The sensor 710 may acquire a user's head or body orientation and/or movement. The sensor 710 may acquire environmental data such as light, temperature, magnetic fields, gravity and/or biometrics. The OP3 may include a list of sensor data including one or more of 6 DoF (X, Y, Z, Yaw, Pitch, and Roll), depth, velocity, or the like.

OP4 may correspond to an interface from the media presentation 712 towards the MCP 716. The media presentation 712 may synchronize and/or present mixed natural and synthetic VR media elements, for example, to provide a full immersive VR experience to the user. The media presentation 712 may carry out color conversion, projection, media composition and/or view synthesis for a (e.g., each) VR media element. The OP4 may include decoded media samples. A sample (e.g., each media sample) may include one or more of a media type, a media sample presentation timestamp, a wall clock counter, an actual presentation viewport, actual presentation time, an actual playout frame rate, audio-to-video synchronization, or the like.

OP5 may correspond to the interface from the VR client control & management 714 towards the MCP 716. The VR client control & management element 714 may manage client parameters such as display resolution, frame rate, field of view (FOV), eye to screen distance, lensSeparation distance, etc. The OP5 may include VR client configuration parameters. A (e.g., each) parameter may include one or more of a display resolution, a display density (e.g., in PPI), a horizontal and vertical FOV (e.g., in degrees), a tracking range (e.g., in mm), tracking precision (e.g., in mm), motion prediction (e.g., in ms), media codec support, OS support, or the like.

The VR client control & management 714 may collect a user's personal profile information if the user (e.g., a VR user) has granted a permission (e.g., besides device information). The personal profile information may include one or more of the VR user's gender, age, location, race, religion, or the like. A VR service application may collect the personal profile information from the metrics server 702. The VR service application may collect the personal profile information (e.g., directly) from the VR client 718 (e.g., including the VR device). The VR service application may identify an appropriate VR content and/or service for a (e.g., an individual) VR user.

A VR streaming service provider may deliver different sets of 360-degree video tiles to different users. The VR streaming service provider may deliver different sets of 360-degree video tiles based on characteristics of different potential viewers. For example, an adult may receive a full 360-degree video including an access to a restricted content. An underage user may watch the same video but without access to the restricted content (e.g., regions and/or tiles). A VR service provider may stop delivering certain VR content to a location and/or at a time (e.g., to a particular location and/or at a particular time) to comply with laws and regulations (e.g., local government laws and regulations). A VR cloud gaming server may deliver different immersive level game(s) to users of varying simulation sickness sensitivities (e.g., male, female, senior adult, and/or youth) to avoid potential simulation sickness. The VR device may control a local VR presentation (e.g., using the personal profile information). For example, a VR service provider may multicast/broadcast a 360-degree video including a restricted scene(s) (e.g., in a nondiscriminatory way to everyone). A (e.g., each) VR receiver may configure presentation based on the personal profile information. The VR receiver may grant different levels of access to the restricted content (e.g., scene(s)) based on the personal profile information. For example, the VR receiver may filter out or blur some or all of the restricted scene(s) based on age, race or religion information of a potential viewer. The VR receiver may determine whether it is appropriate to allow access to some or all of the restricted scene(s) based on age, race or religion information of a potential viewer. The approaches and/or techniques herein may allow the VR service provider to offer a VR content (e.g., a single version of a VR content) to a larger number of users and/or in an efficient way.

The MCP 716 may acquire metrics from one or more OPs and/or derive a VR metric (e.g., a particular VR metric such as latency).

A device (e.g., a VR device, HMD, phone, tablet, or a personal computer) may generate and/or report viewing-related metrics and messages. The viewing-related metrics and messages may include one or more of viewport views, viewport match, rendering device, initial rendering orientation, viewport switching latency, quality viewport switching latency (e.g., quality viewport switching latency), initial latency, settling latency, 6 DoF coordinates, gaze data, frame rate, viewport loss, precision, sensitivity, ROI, and/or the like.

The device may use a metric to indicate which viewport(s) has been requested and/or viewed at what time(s). The metric may include a viewport views metric. A report for a metric such as ViewportViews may indicate which viewport(s) has been requested and viewed at what time(s). The device or the metric server may derive the viewport views metric (e.g., shown in Table 1) from OP4. Table 1 shows example content of a report on viewport views.

TABLE 1

| Key | Type | Description |
| --- | --- | --- |
| ViewportViews | List | List of viewport view measurements during playout. |
| Entry | Object | A (e.g., one) viewport view measurement. |
| source | String | VR media sample source |
| timestamp | Media-time | A presentation time of a media sample |
| t | Real-Time | Time of a measurement |
| duration | Integer | Time interval of a viewport being rendered |
| viewport | Viewport | The viewed viewport |

An entry (e.g., the entry "source") may include (e.g., specify) a source of an origin VR media sample. The device may deduce entry "source" from one or more of an URL of an MPD, a media element representation for DASH streaming, or an original URL of the media sample file for a progressive download.

An entry (e.g., the entry "timestamp") may include (e.g., specify) a media sample presentation time.

An entry (e.g., the entry "duration") may specify the time interval used by the client to report how long the client stays on the respective viewport.

An entry (e.g., the entry "viewport") may include (e.g., specify) a region of omnidirectional media present at media time t. The region may be defined by one or more of center_yaw, center_pitch, static_hor_range, static_ver_range when present, or hor_range and ver_range. For 6 DoF, the entry "viewport" may include a user position or an additional user position (x, y, z).

An entry (e.g., the entry "viewport") may represent the viewed viewport using one or more of notations or expressions used in various specifications and implementations. Viewport views metrics of different users may be compared to and/or correlated with each other, for example, by a metrics server (e.g., the metrics server 702). For example, the metrics server may determine the viewports that are more popular. A network (e.g., the CDN) may use the information (e.g., the entry "viewport") for caching or for content production. The device (e.g., the VR device) may record one or more viewport views with a certain precision(s) for replay. The recorded viewport views may be used later (e.g., by another viewer) to replay a specific version of the 360 video that was watched earlier. A network element such as a broadcast/multicast server or a VR client(s) may synchronize multiple viewers' viewed viewports based on the viewport views metrics. The viewers may have similar or same experience, for example, in real time.

The device (e.g., a client) may log the viewport views metric (e.g., periodically) and/or be triggered to report the viewport views metric by a viewing orientation change(s) (e.g., detected by a sensor).

The device may use a metric to indicate whether a client follows a recommended viewport (e.g., a director's cut). The metric may include a viewport match metric. The device (e.g., a client) may be able to compare the client's viewing orientation with corresponding recommended viewport metadata and/or log a match event if the client's viewing orientation matches corresponding recommended viewport metadata. Table 2 shows example content of a report on the viewport match metric.

TABLE 2

| Key | Type | Description |
| --- | --- | --- |
| ViewportMatchList | List | List of viewport matches. |
| Entry | Object | a viewport match event. |
| Flag | Boolean | Value 'true' may indicate that the the viewing orientation matches a recommended viewport; 'false' may indicate that the viewing orientation does not match the recommended viewport. |
| source | String | May specify the location(s) of media data (e.g., normally URLs). |
| trackId | Integer | May specify track id of the matched recommended viewport timed metadata. The value may be larger than or equal to 1. |
| timestamp | Media-time | The media presentation time of media sample. |
| t | Real-Time | Time of measurement. |
| count_ | integer | Number of matches with the same trackId value. |
| duration | Integer | Time interval of a continuous viewport match. |
| type | Integer | May specify the type of the recommended viewport. Value 0 may indicate a recommended viewport per the director's cut, and value 1 may indicate a recommended viewport selected based on measurement statistics. |

An entry (e.g., the entry "flag") may be a boolean parameter specifying whether the viewport (e.g., the current viewport) matches the recommended viewport during a measurement interval. Any one or a combination of the following parameters may be presented when the value of the entry "flag" is true. An entry (e.g., the entry "trackId") may be the identifier of a sequence of recommended viewport timed metadata, and/or may be used to identify which recommended viewport is being matched among one or more recommended viewports. An entry (e.g., the entry "count") may specify an accumulated number of matches for the recommended viewport specified by "track". An entry (e.g., the entry "duration") may specify the time interval of a continuously viewport match during a measurement interval. An entry (e.g., the entry "type") may specify a matched viewport type, where value 0 may indicate that the recommended viewport is a director's cut, and/or value 1 may indicate that the recommended viewport is selected based on viewing statistics. The device (e.g., a client) may log the viewport match (e.g., periodically) and/or be triggered to report the viewport match by an event when a viewing orientation changes or the recommended viewport position and/or size changes.

The device may use a metric to indicate rendering device metrics and messages. The metric may include Rendering Device. For example, a VR device type report for the metric Rendering Device may indicate one or more of the brand, model, operating system (OS), resolution, density, refreshrate, codec, projection, packing, tracking range, tracking precision, tracking sensitivity, and/or other device-specific information for the device (e.g., where an omnidirectional media is being rendered). The metrics server may determine based on the report whether the content is being consumed on a TV vs. an HMD or a daydream type of HMD. The metrics server or the client may correlate this information with the content type for better analytics. If the VR device is an HMD, information such as supported HMD-specific information may be included in the metric. The client (e.g., VR client) may determine appropriate device information for reporting to the metrics server. The metrics server may request appropriate information from the VR device. The supported HMD-specific information may include, but is not limited to, precision, sensitivity, max supported frame rate, max supported resolution and/or a list of supported codecs/projection methods. Table 3 shows example content of a report on a VR device (e.g., the metric RenderingDevice). The metrics server may correlate information such as the one in Table 3 with a content type for analytics. For example, the client or the metric server may derive the metric Rendering Device and/or one or more of the entries as included in Table 3 from OP5.

TABLE 3

| Key | Type | Description |
| --- | --- | --- |
| RenderingDevice | Object | VR device related information. |
| Brand | String | Brand of a VR device. |
| Model | String | Model of a VR device. |
| OS | String | OS of a VR device along with version information. |
| Resolution | String | Display resolution of a VR device. |
| Density | String | Display pixel density in PPI. |
| Refresh Rate | String | Display refresh rate of a VR device. |
| Codec | String | Media Codec support. |
| Projection | String | Projection format support. |
| Packing | String | Region-wise packing support. |
| TrackingRange | Vector | Maximum 6DoF tracking range in millimeter. |
| TrackingPrecision | Vector | Minimum 6DoF tracking notation unit in millimeter for translation movement and millidegree for rotation movement. |
| TrackingSensitivity | Vector | Minimum 6DoF movement to be detected in millimeter for translation movement and millidegree for rotation movement. |

TABLE 3-continued

| Key | Type | Description |
| --- | --- | --- |
| TrackingLatency | Integer | |
| RenderingLatency | Integer | |
| Other | String | Any other device-specific information. |

Figure 8:
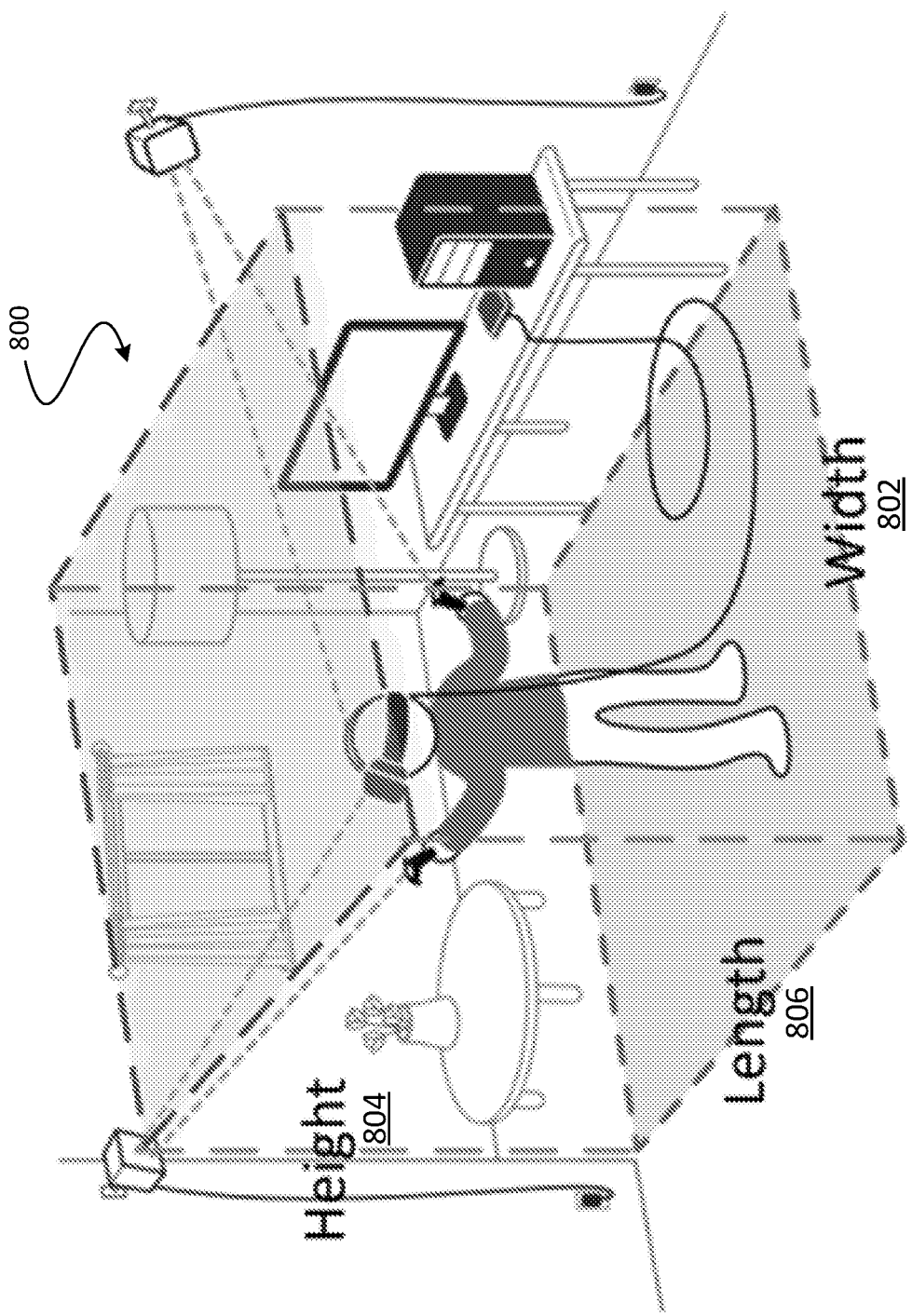
FIG. 8 shows an example of a 3D motion tracking range.
Figure 9:
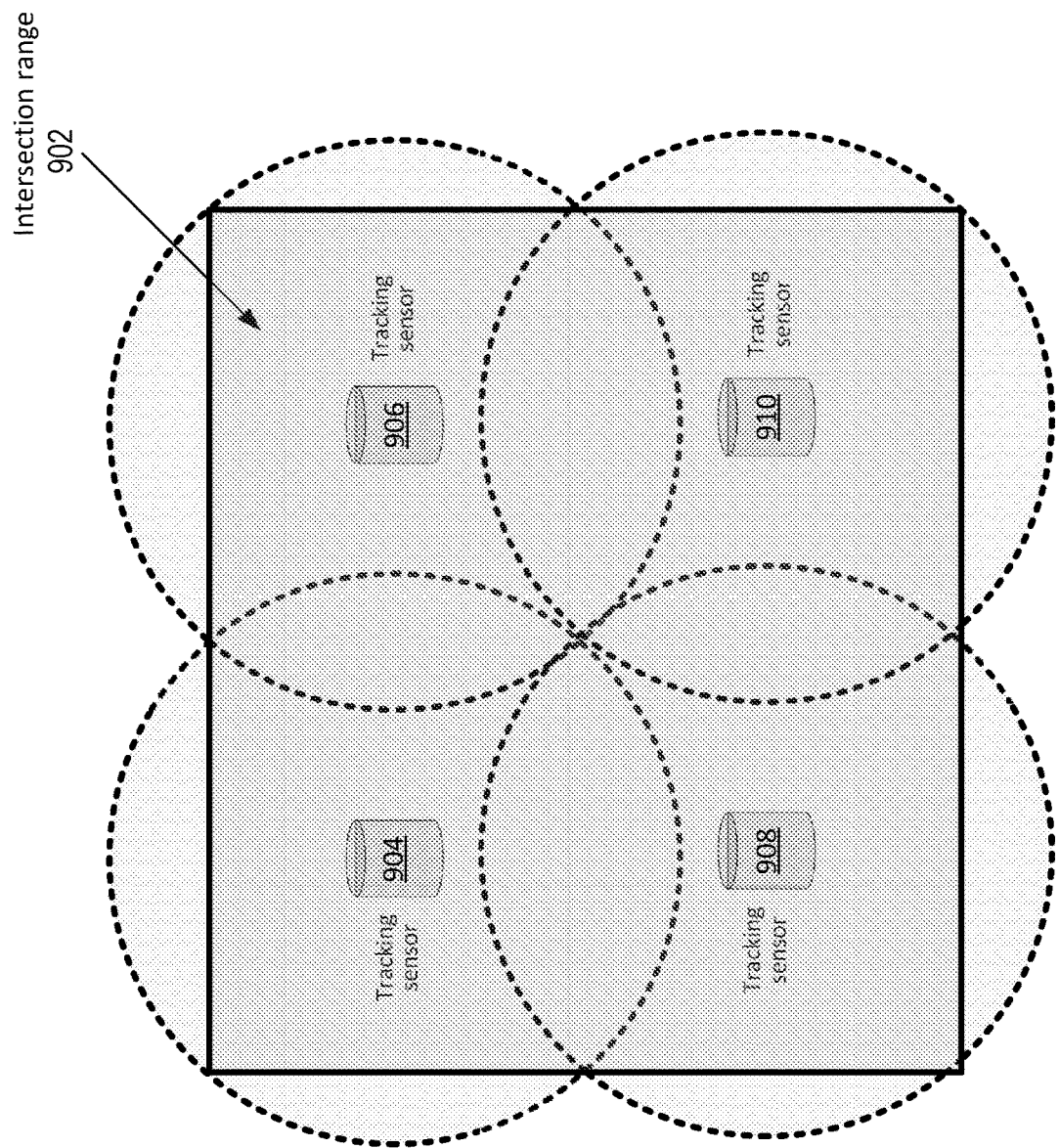
FIG. 9 shows an example of a 2D motion tracking intersection range with multiple sensors.

An entry (e.g., the entry "trackingRange") may include (e.g., specify) a maximum or the largest 2D or 3D tracking range supported by a VR device for the VR user motion detection. The maximum or the largest 2D or 3D tracking range may imply that motion tracking and detection may be inaccurate beyond the maximum or the largest 2D or 3D tracking range. A minimum or the smallest range may be a point. The TrackingRange may be defined as, for example, width, length and height of the VR room (e.g., in a unit of millimeter). FIG. 8 may show an example of a measurement of a 3D tracking range. The entry TrackingRange may be defined as width 802, height 804, and length 806 of a 3D space 800 or a circle range for a 2D range with a (e.g., a single) tracking sensor. The entry "trackingRange" may be defined as width, length for a 2D intersection area with multiple tracking sensors. FIG. 9 shows an example of a 2D motion tracking intersection range with multiple sensors, for example tracking sensors 904-910. As shown in FIG. 9, the length and width of the 2D intersection area 902 may define the entry "trackingRange."

An entry (e.g., the entry "trackingPrecision") may include (e.g., specify) a tracking notation unit (e.g., a minimum tracking notation unit) in millimeter for translation movement (x, y, z) and millidegree for rotation movement (yaw, pitch, roll).

An entry (e.g., the entry "trackingSensitivity") may include (e.g., specify) a minimum motion displacement (e.g., a subtle motion) that can be detected by the VR device in millimeter ($\Delta x$, $\Delta y$, $\Delta z$) for translation and millidegree ($\Delta yaw$, $\Delta pitch$, $\Delta roll$) for rotation.

An entry (e.g., the entry "TrackingLatency") may indicate (e.g., specify) a time interval between a motion and the sensor's detecting and reporting the motion to an application.

An entry (e.g., the entry "Rendering Latency") may indicate (e.g., specify) a time interval between a media sample being output from a rendering module and the media sample being present on a display and/or headphones.

The device (e.g., the VR device) may generate and/or report initial rendering orientation messages. The device may use a metric to indicate the orientation from which the playback is to be started. The metric may include InitialRenderingOrientation. An initial rendering orientation report for the metric "InitialRenderingOrientation" may indicate the orientation from which the playback should be started. An initial rendering orientation report for the metric "InitialRenderingOrientation" may indicate the orientation from which the playback should be started. The initial orientation may be indicated at the beginning of the presentation and/or at certain points throughout the presentation (e.g., scene changes). A content producer may provide the indication. An initial rendering orientation message(s) may be of PER type. For example, the initial rendering orientation message(s) may be sent from a DANE to a DASH client. The information (e.g., initialRenderingOrientation) may be carried in a timed metadata track, an event stream element or a SAND-PER message. The metrics server may use the initial rendering orientation metric to configure an HMD orientation to reset the coordinate(s) of a rendering position for the VR content (e.g., when the scene change occurs). With an initial rendering orientation message, the HMD may move another video area to the front face. Table 4 shows example content of an initial rendering orientation message. The metric server or the client may derive the metric and/or one or more of the entries as included in Table 4 from OP2.

TABLE 4

| Parameter | Type | Cardinality | Description |
| --- | --- | --- | --- |
| InitialRenderingOrientation | Object | 1 | An orientation from which a playback may be started. |
| t | Media-Time | 1 | Time corresponding to setting a rendering orientation. |
| orientation | Viewport | 1 | Initial rendering orientation as a viewport. |

The device may generate a metric to indicate the latency that a client experiences when switching from a viewport to another viewport. The metric may include "ViewportSwitchingLatency." For example, a viewport switching latency metric report(s) for the metric "ViewportSwitchingLatency" may indicate the latency that a client experiences when switching from a viewport to another viewport. A network or client (e.g., a VR device) may use the viewport switching latency metric to measure a quality of experience (QoE) of a viewer. (SAND) DANE elements and/or an origin server may use the viewport switching latency metric on one or more of content encoding, packaging, caching, or delivery. Table 5 shows an example report on the viewport switching latency metric. The metric server or the client may derive the viewport switching latency metric and/or one or more of the entries shown in Table 5 from OP3 and/or OP4.

TABLE 5

| Key | Type | Description |
| --- | --- | --- |
| ViewportSwitchingLatency | List | List of viewport switching latency measurements during playout. |
| Entry | Object | One viewport switching latency measurement. |
| translation | Vector | Translational displacement. |
| rotation | Vector | Rotational displacement. |
| first_viewport | Vector | The position and size of a first viewport. |
| second_viewport | Vector | The position and size of a second viewport. |
| T | Real-Time | Time of detection of a movement to the second viewport. |
| latency | Integer | Viewport switching latency in milliseconds. |

An entry (e.g., the entry "translation") may include (e.g., specify) a user's translational movement such as forward/back, up/down, left/right, and/or may be expressed by a displacement vector ($\Delta x$, $\Delta y$, $\Delta z$).

An entry (e.g., the entry "rotation") may include (e.g., specify) a user angular movement such as yaw, pitch and roll, and/or may be expressed by an angular displacement in radians or degrees (Δyaw, Δpitch, Δroll).

An entry (e.g., the entry "first_viewport") may include (e.g., specify) the center point coordinate(s) of a first viewport and the size of the first viewport.

An entry (e.g., the entry "second_viewport") may indicate (e.g., specify) the center point coordinate(s) of a second viewport and the size of the second viewport.

An entry (e.g., the entry "latency") may include (e.g., specify) a delay between an input translational and/or rotational movement and a corresponding viewport of one or more relevant VR media elements (video, audio, image, light field, etc.) updated or displayed on a VR presentation. For example, the entry "latency" may specify a time interval between a time when a head movement from the first viewport to the second viewport occurs (e.g., when the client detects the head movement) and a time when the corresponding second viewport is presented on the display.

For example, the viewport switching latency may correspond to how fast an HMD responds to a head movement, unpacks and renders content for a shifted viewport. The viewport switching latency may correspond to time between a time when a viewer's head moves (e.g., the HMD detects a viewer's head movement) and a time when the viewer's head movement impacts a video observed by the viewer. For example, the viewport switching latency may be measured between a head movement from a current viewport to a different viewport and the different viewport being displayed on the HMD. The viewport switching latency may be caused, for example, by a network or a client's insufficient processing capability that the network or client uses to fetch and/or render a corresponding viewport. The network and/or client player may use different intelligent approaches to minimize viewport switching latency after receiving and analyzing the viewport switching latency metric report(s) along a timeline.

A device (e.g., HMD, phone, tablet, or a personal computer) may determine a movement of the device (e.g., a head movement). The movement of the device may include one or more of the device's moving outside of a current viewport, an orientation change, a zooming operation, or the like. The device may determine the viewport switching latency based on the movement of the device.

Figure 10:
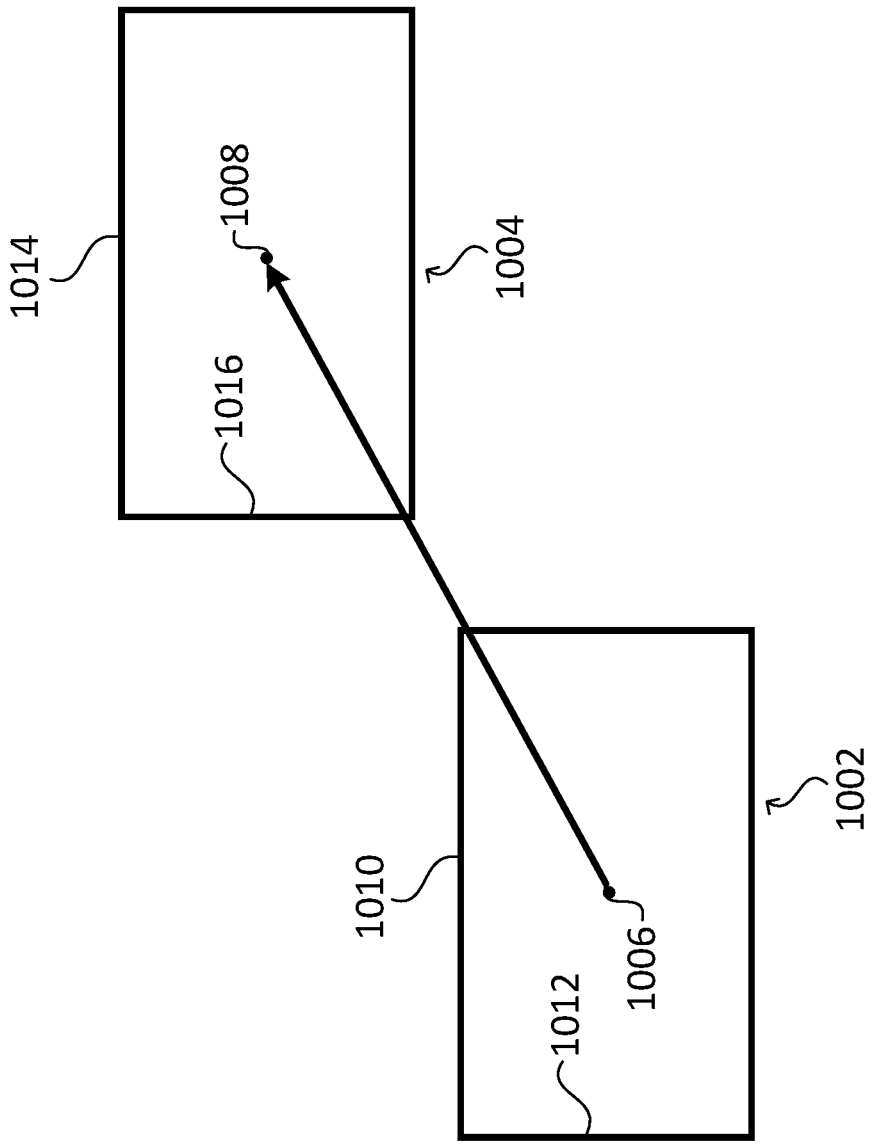
FIG. 10 shows an example of a viewport switch event.

FIG. 10 shows an example of a viewport switch event. The device may determine the movement of the device based on a viewport switch event. A viewport may be represented by a set of parameters. As shown in FIG. 10, the first viewport 1002 may be represented by 1010 first_azimuth_range, 1012 first_elevation_range, and 1006 first_centre_azimuth and/or first_centre_elevation. The second viewport 1004 may be respresented by 1014 second_azimuth_range, 1016 second_elevation_range, and 1008 second_centre_azimuth and/or second_centre_elevation.

The device may determine a viewport switch event if a change in one or more of the set of parameters is equal or greater than a threshold. The device may determine the movement of the device if a change in one or more of the set of parameters is equal or greater than a threshold. The device may apply one or more constraints when determining the viewport switch event to maintain a consistent measurement across different applications and/or devices.

The device may determines that a first_viewpoint 1002 associated with a first rendered viewport is stable before a viewport switch event, for example, based on one or more parameters 1010 first_azimuth_range, 1012 first_elevation_range, and 1006 first_centre_azimuth and/or first_centre_elevation associated with the first viewport 1002. Similarly, the device may determine that a second_viewpoint 1004 associated with a second rendered viewport is stable after the viewport switch event, for example, based on one or more parameters 1014 second_azimuth_range, 1016 second_elevation_range, and 1008 second_centre_azimuth and/or second_centre_elevation associated with the second viewport. For example, a viewpoint may be represented by one or more of centre_azimuth, centre_elevation, and/or centre_tilt, for example, as illustrated in FIG. 10. Centre_azimuth and centre_elevation may indicate the center of the viewport. Centre_tilt may indicate a tilt angle of the viewport (e.g., in units of $2^{-16}$ degrees relative to the global coordinate axes). For example, the value of the first viewpoint's centre_azimuth, centre_elevation, and/or centre_tilt may not change more than m units of $2^{-16}$ degrees within n milliseconds before the viewport switch event, and the value of the second_viewpoint's centre_azimuth, centre_elevation, and/or centre_tilt may not change more than m units of $2^{-16}$ degrees within n milliseconds after the viewport switch event. Both m and n may be positive integer number. The device may be configured with m and n. For example, the device may receive the value of m and n (e.g., from a content server or from a metrics server). The device may log and/or report the metrics with m and n that are used to identify the viewport switch event.

The viewport switch event may be triggered when a viewpoint (e.g., for a viewer) moves outside the current rendered or displayed viewport of a device. The device may determine the movement of the device when a viewpoint (e.g., for a viewer) moves outside the current rendered or displayed viewport. A first viewport 1002 or a first rendered viewport may be represented by the first viewport 1002 or the first rendered viewport's center position 1006 (e.g., first_centre_azimuth, first_centre_elevation, first_centre_tilt) and/or the first viewport or the first rendered viewport's region (e.g., first_azimuth_range 1010, and first_elevation_range 1012), for example, as illustrated in FIG. 10. A second viewport 1004 or a second rendered viewport may be represented by the second viewport 1004 or the second rendered viewport's center position 1008 (e.g., second_centre_azimuth, second_centre_elevation, second_centre_tilt) and/or the second viewport or the second rendered viewport's region (e.g., second_azimuth_range 1014, and second_elevation_range 1016).

The device may determine that a viewport switch event occurs when a change of a parameter (e.g., a difference between a parameter of the first viewport 1002 and a parameter of the second viewport 1004) is equal or greater than a threshold. For example, the viewport switch event may occur when the distance between first_centre_azimuth 1006 and second_centre_azimuth 1008 is equal to or larger than a threshold value (e.g., first_azimuth_range/2). The viewport switch event may occur when the distance between first_centre_elevation 1006 and second_centre_elevation 1008 is equal to or larger than a threshold value (e.g., first_centre_range/2).

The viewport switch event may be triggered by the device's detection of a viewing orientation change. A viewing orientation may be defined by a triplet of azimuth, elevation, and tilt angle characterizing an orientation at which a user is consuming an audio-visual content. A viewing orientation may be defined by a triplet of azimuth, elevation, and tilt angle characterizing an orientation of a viewport when a user is consuming an image or video. For example, the device may determine the movement of the device when the device detects a viewing orientation change. The viewing orientation may, for example, relate to the relative location or positioning of the viewport.

Figure 11:
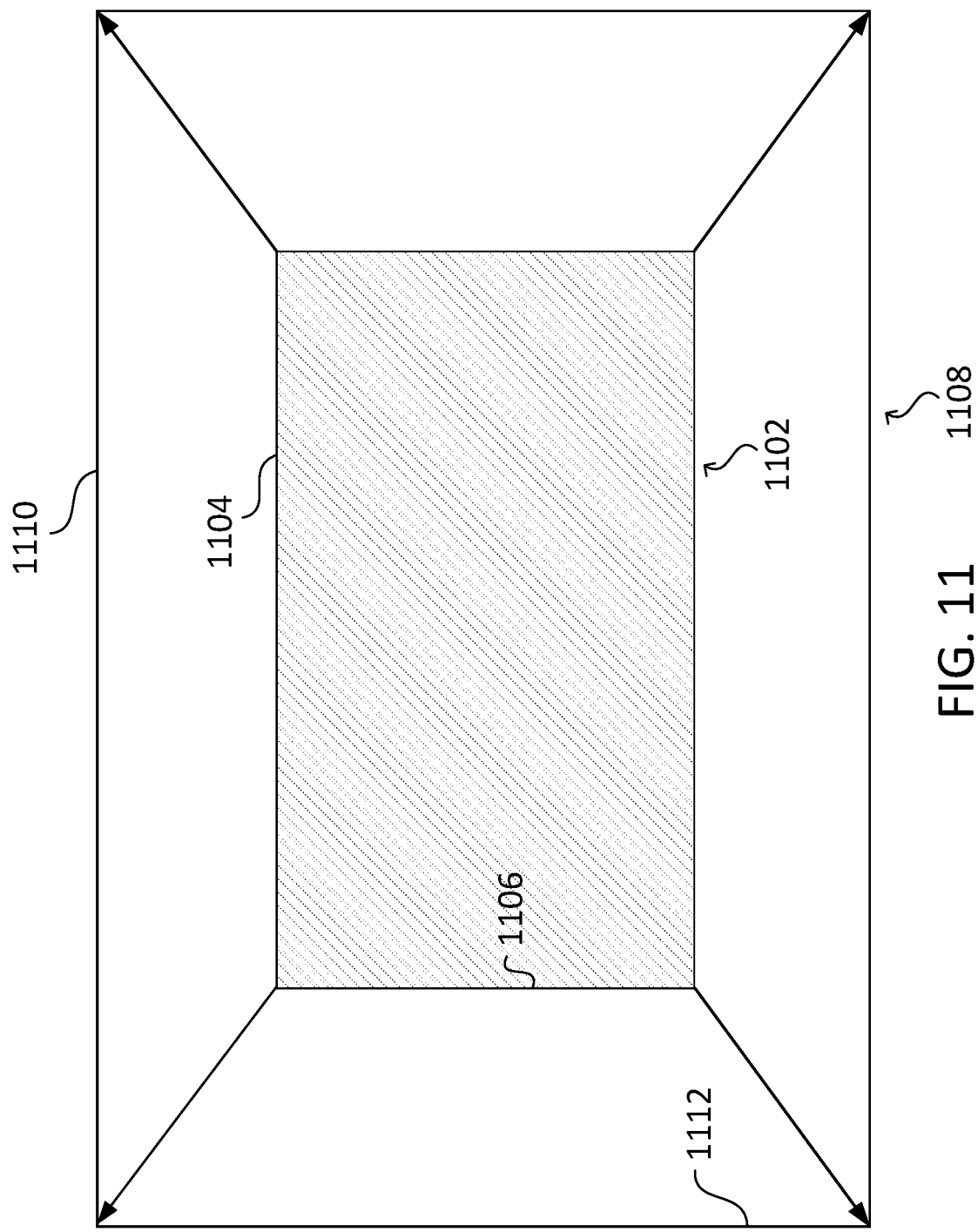
FIG. 11 shows an example of a 360 video zooming operation.

A viewport switch event may occur during a zooming operation(s). For example, the device may determine that the device is moving during the zooming operation(s). For example, the zooming operation may occur even though a rendered or displayed viewport center position does not change, but the size of the corresponding viewport and/or the corresponding spherical area changes. FIG. 11 may show an example of 360 video viewport zooming. The parameters first_viewpoint and second_viewpoint of ViewportSwitchingLatency may be replaced by first_viewport size 1102 and second_viewport size 1108 for the zooming operation(s), respectively. Parameters azimuth_range and/or elevation_range may specify the range(s) through the centre point of the viewport being rendered (e.g., in the units of $2^{-16}$ degrees). The device may determine that a viewport switch event occurs when a difference between the first viewport size 1102 and the second viewport size 1108 is equal or greater than a threshold. The first viewport size 1102 and the second viewport size 1108 may be determined by azimuth_range 1104 and/or elevation_range 1106 for the first viewport, and by azimuth_range 1110 and/or elevation_range 1112 for the second viewport. The device may determine the first_viewpoint size 1102 before the viewport switch event and the second_viewpoint size 1108 after the viewport switch after the first and second viewports, respectively, are determined to be stable. For example, the device may determine that the first viewport is stable when the first viewport size 1102 does not change more than m units of $2^{-16}$ degrees within n milliseconds before the viewport switch event, and the device may determine that the second viewport is stable when the second_viewport size 1108 does not change more than m units of $2^{-16}$ degrees within n milliseconds after the viewport switch event.

The device may generate a metric to indicate the latency, or time it takes for a quality of a displayed viewport to recover to a quality threshold after a change in movement of the device. For example, the device may determine, after the device moves from a first viewport to a second viewport, a quality viewport switching latency metric based on a time interval between a first viewport and a second viewport, for example, when the quality of the second viewport reaches a quality threshold. For example, when the quality of the second viewport reaches the quality of the first viewport or a quality better and/or greater than the quality of the first viewport, the quality viewport switching latency metric may be represented by an equal-quality viewport switching latency metric. The equal-quality viewport switching latency metric may be a subset of the quality viewport switching latency metric. For the quality viewport switching latency metric, the quality of the second viewport may or may not reach the quality of the first viewport. The quality of the second viewport may be less than the quality of the first viewport but greater than a quality threshold. The device may be configured with the quality threshold or receive the quality threshold (e.g., from a metrics server). The device may determine or specify the quality threshold and/or report the quality threshold to the metrics server.

The quality threshold may be defined using a difference between multiple (e.g., two) qualities. For example, the quality threshold may be reached when the difference (e.g., the absolute difference or the difference between absolute values of the qualities or quality rankings) between the quality of the first viewport and quality of the second viewport is equal or less than a threshold.

The device may generate a metric to indicate the latency that the device experiences when switching from a current viewport to a different one, and until the different viewport reaches the same or similar presentation quality as the current viewport. For example, the device may determine an equal-quality viewport switching latency metric. An equal-quality viewport switching latency metric report(s) for the metric "EQViewportSwitchingLatency" may indicate a latency that the device experiences when switching from a current viewport to a different viewport and until the different viewport reaches the same or greater quality as the current viewport, or until the different viewport reaches a quality level that exceeds a quality threshold but is less than the quality of the current viewport. The metric server may, for example, use the equal-quality viewport switching latency metric to measure the QoE of a viewer. Table 6 shows an example report on the equal-quality viewport switching latency metric. The device or the metric server may derive the equal-quality viewport switching latency metric and/or one or more of the entries shown in Table 6 from OP3 and/or OP4.

Table 6 shows example content of a report on equal-quality viewport switching latency metric.

TABLE 6

| Key | Type | Description |
| --- | --- | --- |
| EQViewportSwitchingLatency | List | List of equal-quality viewport switching latency measurements during playout. |
| Entry | Object | One equal-quality viewport switching latency measurement. |
| translation | Vector | Translational displacement. |
| rotation | Vector | Rotational displacement. |
| quality_ranking | Integer | Quality ranking of the viewport. |
| first_viewport | Vector | The position and size of a first viewport. |
| second_viewport | Vector | The position and size of a second viewport. |
| t | Real-Time | Time of the detection of the movement to the second viewport. |
| latency | Integer | Equal-quality viewport switching latency in milliseconds. |

For example, a user may watch viewport A at a quality (e.g., high quality (HQ)), when the user moves his/her head to watch viewport B. Viewport B's quality may be in a different quality (e.g., low quality (LQ) due to viewport adaptive streaming). It may take time to increase the quality of viewport B from LQ to HQ depending on one or more of motion detection, viewport request scheduling, and network condition(s). The user may move her head to viewport C before the quality of viewport B increases from LQ to HQ. The quality viewport switching latency metric may correspond to the time between switching from the presentation of viewport A at the first quality to the presentation of viewport B and/or viewport C at a quality greater than a quality threshold on a display (e.g., an HMD display or conventional display). The equal-quality viewport switching latency metric may correspond to the time between switching from the presentation of viewport A at the first quality to the presentation of viewport B and/or viewport C on a display at a quality that is the same as or greater than the first quality of viewport A (e.g., an HMD display or conventional display). The quality threshold may be less than the first quality viewport A. The quality threshold may be reached when the difference (e.g., the absolute difference or the difference between absolute values of the qualities or quality rankings) between the first quality of viewport A and quality of the viewport B and/or viewport C is equal or less than a threshold.

An entry (e.g., the entry "translation") of the metric "EQViewportSwitchingLatency" may include (e.g., specify) HMD position translation in multiple (e.g., 3) degrees of freedom, forward/back, up/down, left/right, and/or may be expressed by a vector(s) (e.g., constant vectors ($\Delta x$, $\Delta y$, $\Delta z$)). An entry (e.g., the entry "rotation") may include (e.g., specify) an HMD circular movement in multiple (e.g., 3) degrees of freedom (e.g., yaw, pitch and roll) and/or may be expressed by a vector(s) (e.g., constant vectors ($\Delta$yaw, $\Delta$pitch, $\Delta$roll)). An entry (e.g., the entry "quality_ranking") may include (e.g., specify) a quality of the viewport being rendered to the user after the viewport switch (e.g., at the end point). The quality of the viewport may indicate the quality of presentation. The higher of a quality ranking value, the lower the quality of the presentation. An entry (e.g., the entry "latency") may include (e.g., specify) a delay between an input translation and/or rotation movement and a quality of a corresponding viewport updated on the VR presentation.

A viewport may be covered by multiple regions. The viewport may comprise one or more portions of one or more DASH video segments. For example, a viewport may be covered by multiple regions that are based on multiple DASH video segments. A region may be composed of one or more DASH video segments or one or more portions of the one or more DASH video segments. The viewport may be defined by a quality. The region (e.g., each region) may be defined by a quality, for example, as indicated by a quality ranking value based on one or more region-wise quality ranking (RWQR). The region may be an independently coded sub-picture (e.g., a video segment) and/or a region-wise quality ranking region of a single layer Representation. The device or the metrics server may derive a quality (e.g., as indicated by a quality ranking value) of the viewport as an average of the qualities of the regions. The qualities of the regions may be determined based on quality ranking values of the regions, or the minimum or maximum quality ranking value among the quality ranking values of the regions that the viewport is composed of. The quality of the viewport may be calculated, for example, as a weighted average of the qualities of each respective region or video segment that the viewport is composed of. The quality of the viewport may be calculated, for example, as a weighted average of the quality (e.g., as indicated by quality ranking value) of each respective region or video segment that the viewport is composed of. The weights may correspond to the area, the size, and/or the portion of the viewport being covered by each respective region. The quality of a viewport may be indicated by a quality level, a quality value, and/or a quality ranking.

Figure 12:
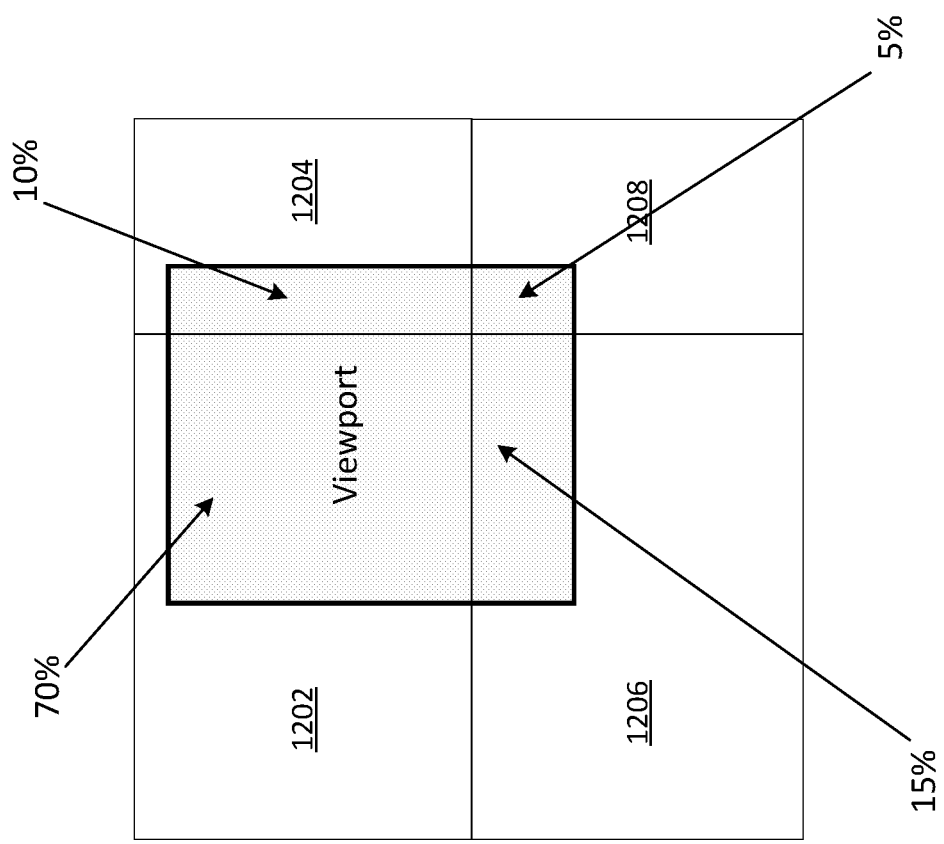
FIG. 12 shows an example of weighted viewport quality for sub-picture case.

FIG. 12 is an example of a sub-picture based streaming. The sub-picture may correspond to one or more DASH video segments or one or more portions of the DASH video segments. In FIG. 12, a viewport may be comprised of 4 sub-pictures, where each sub-picture has that sub-picture's own quality (e.g., as indicated by a quality ranking value). For example, the quality ranking value of sub-picture A 1202 may be 1, the quality ranking value of sub-picture B 1204 may be 3, the quality ranking value of sub-picture C 1206 may be 2, and the quality ranking value of sub-picture D 1208 may be 5. The coverage of the sub-picture may be represented by a percentage of the viewport area covered by the corresponding sub-picture. As shown in FIG. 12, 70% of viewport area may be covered by sub-picture A 1202, 10% of viewport area may be covered by sub-picture B 1204, 15% of viewport area may be covered by sub-picture C 1206, and 5% of viewport area may be covered by sub-picture D 1208. The quality of the viewport may be calculated, for example, using Eq. 3. quality(viewport) may represent a quality ranking value of the viewport. quality (subpicture(n)) may represent the a quality ranking value of subpicture n. coverage(subpicture(n)) may represent a percentage of area of subpicture n in the viewport.

$$\text{quality(viewport)} = \Sigma_{k=0}^{n} \text{quality(subpicture}(n)) \times \text{coverage(subpicture}(n)) \quad \text{Eq. 3}$$

Eq. 4 provides an example of the quality ranking value of the viewport in FIG. 12 that is derived using Eq. 3.

$$\begin{aligned}\text{Quality(viewport)} &= \text{quality(sub-picture}A)*\text{coverage} \\ &\quad (\text{sub-picture}A) + \text{quality(sub-picture}B)*\text{coverage} \\ &\quad (\text{sub-picture}B) + \text{quality(sub-picture}C)*\text{coverage} \\ &\quad (\text{sub-picture}C) + \text{quality(sub-picture}D)*\text{coverage} \\ &\quad (\text{sub-picture}D) = 1*0.7 + 3*0.1 + 2*0.15 + \\ &\quad 5*0.05 = 1.55 \quad \text{Eq. 4}\end{aligned}$$

Figure 13:
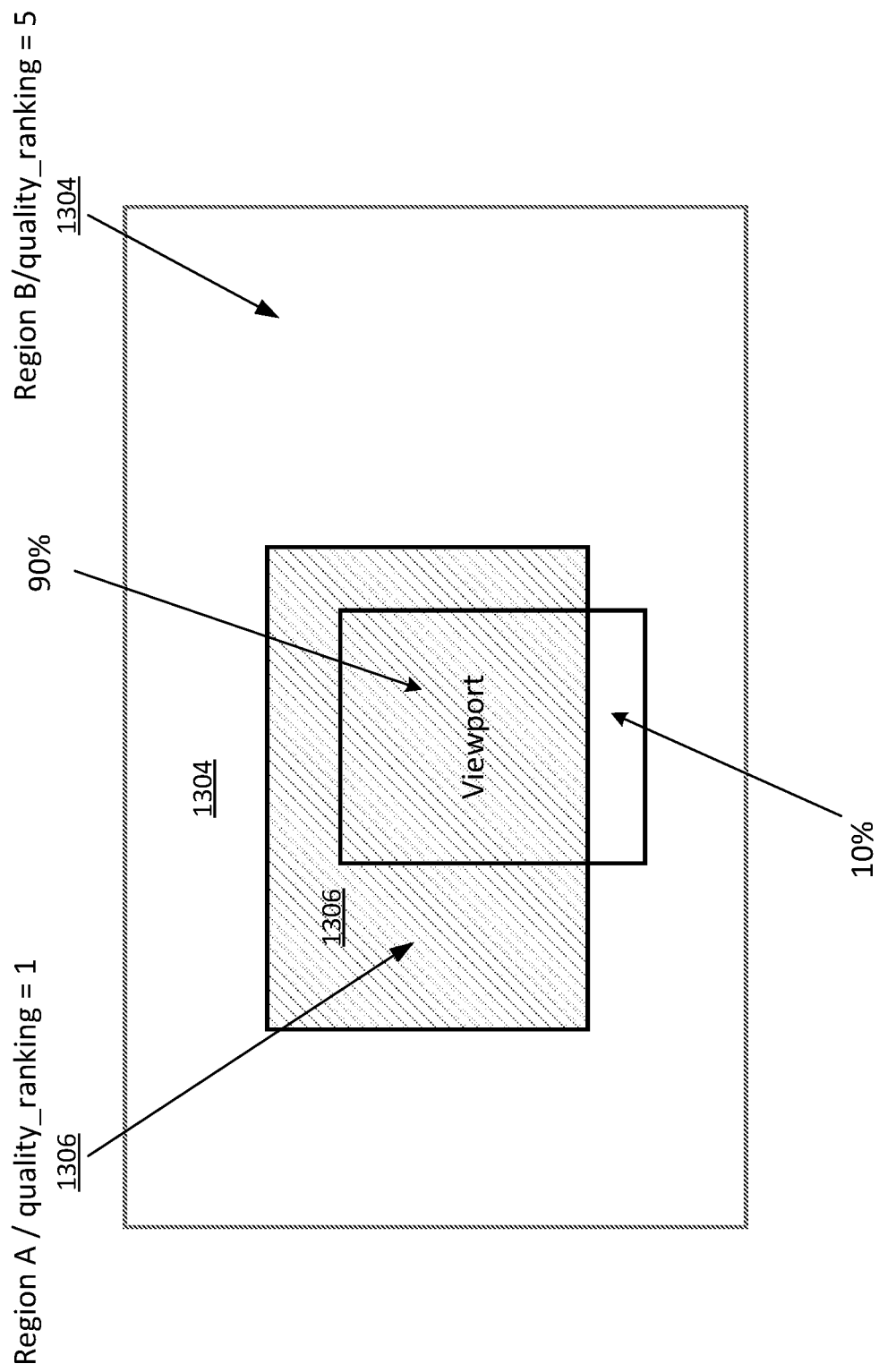
FIG. 13 shows an example of weighted viewport quality for region-wise quality ranking (RWQR) encoding case.

FIG. 13 is an example of a region-wise quality ranking (RWQR) encoding case where the viewport is covered by both a high quality region (e.g., region A 1306) and a low quality region (e.g., region B 1304). The region quality may be indicated by the corresponding RWQR value. RWQR value for region A 1306 may be 1. RWQR value for region B 1304 may be 5. 90% of the viewport may be covered by region A and 10% of the viewport may be covered by region B 1304. The quality ranking value of the viewport may be calculated, for example, using Eq. 5.

$$\begin{aligned}\text{Quality(viewport)} &= \text{quality(region}A)*\text{coverage(region}A) + \text{quality(region}B)*\text{coverage} \\ &\quad (\text{region}B) = 1*0.9 + 5*0.1 = 1.4 \quad \text{Eq. 5}\end{aligned}$$

The quality viewport switch event may be identified when the quality of a second viewport being rendered by the device is greater than a threshold quality. For example, the quality viewport switch event may be identified when the quality ranking value of a second viewport being rendered is equal to or less than the quality ranking value of a first viewport being rendered before the switch. The equal quality viewport switch event may be identified when the quality ranking value of the second viewport being rendered is less than the quality ranking value of the first viewport before the viewport switch event.

EQViewportSwitchingLatency may be used to define the latency associated with the equal quality viewport switch event for an orientation change. The EQViewportSwitchingLatency may be a time interval between the time when the device (e.g., the sensor of the device) detects a user orientation change from a first viewport to a second viewport (e.g., the viewport switch herein may be identified as an equal quality viewport switch) and the time when the second viewport is fully rendered to the user at the same or similar quality as the quality of the first viewport.

Figure 14:
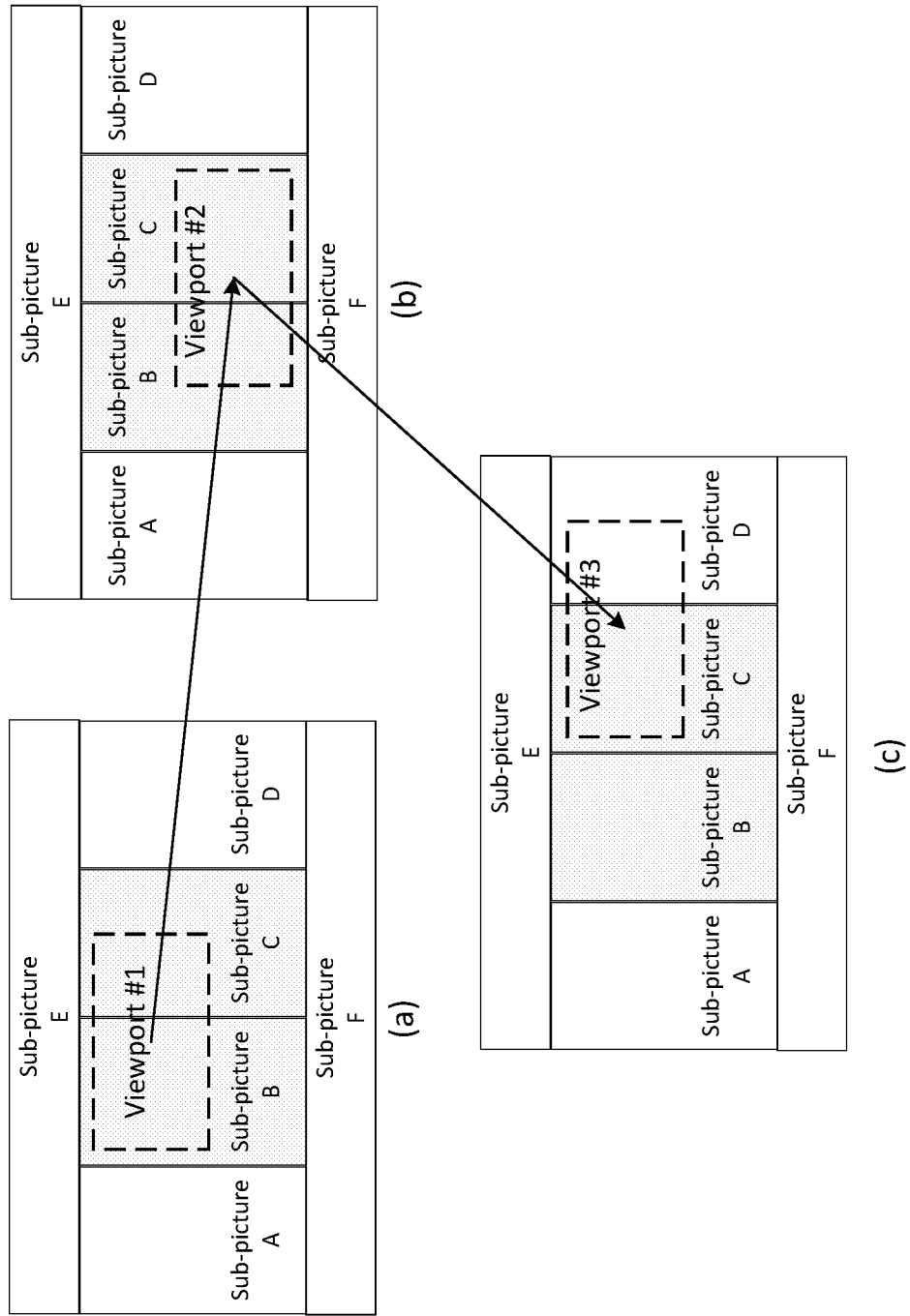
FIG. 14 shows an example of an equal quality viewport switch event.

FIG. 14 shows an example of an equal quality viewport switch event. The device may receive and decode a plurality of sub-pictures (e.g., DASH video segments), such as sub-pictures A-F. The sub-pictures A-F may correspond to a respective video segment(s) and a respective quality (e.g., as indicated by quality ranking value(s)). The device may generate viewport #1 using subpictures B and C. The device may render (e.g., display) viewport #1 on a display of the device for the user. The device or the metrics server may derive the quality ranking value of viewport #1 from the quality ranking value(s) of sub-picture B and C. The quality ranking value of sub-picture B and C may be (e.g., usually) lower than the quality ranking value of sub-picture A, D, E and F in a viewport adaptive streaming scenario. When the device moves and the user viewing orientation moves from viewport #1 to viewport #2 as shown in FIG. 14(b), the viewport #2 may be covered by sub-pictures B and C. The sub-pictures B and C of viewport #2 may be the same or different from the sub-pictures B and C used to create viewport #1. The viewport #2 may have the same quality as the quality of the viewport #1, or viewport #2 may have a different quality as the quality of viewport #1. The device or the metrics server may derive the quality (e.g., as indicated by quality ranking value) of viewport #2 from the quality ranking value(s) of sub-picture B and C.

When the device moves and causes the user viewing orientation to move from viewport #2 to viewport #3 as shown in FIG. 14(c), the viewport #3 may be covered by sub-pictures C and D. The sub-pictures C and D that are used to generate viewport #3 may be the same or different from the sub-pictures C and D that are requested by the client when the client presents viewport #1 and/or viewport #2. Sub-pictures C and D may not be used to generate viewport #1 and viewport #2. Sub-pictures C and D may be requested to handle a change (e.g., a sudden viewing orientation change). The device or the metrics server may derive the quality of viewport #3 from the quality ranking(s) of sub-picture C and D. The device may compare the quality of viewport #3 to the quality of viewport #1, viewport #2, and/or a quality threshold that is greater than the quality of viewport #2 but less than the quality of viewport #1. The device may request a different (e.g., a new) representation of sub-picture D with a better quality, for example, if the device determines that the quality of viewport #3 is less than the quality of viewport #1 or less than the threshold. The better quality may be represented, for example, by a lower quality ranking value than the original quality ranking value of sub-picture D. The device may determine and/or report a quality viewport switch event when, for example, the device determines that the quality of viewport #3 greater than the quality threshold or is equal to or greater than the quality of viewport #1 (e.g., an equal quality viewport switch event) when the different (e.g., new) representation of sub-picture D is received and used to generate viewport #3.

Figure 15:
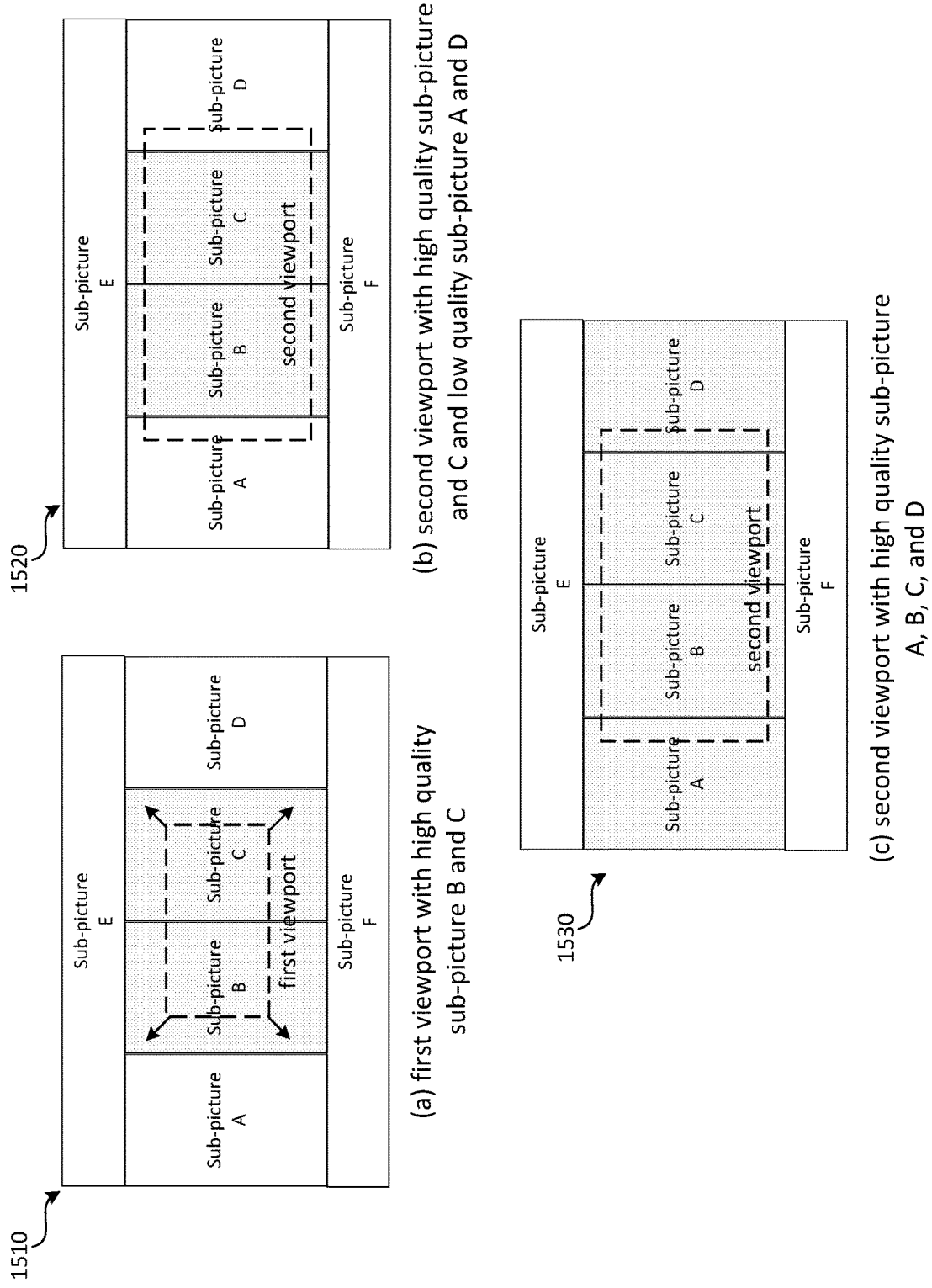
FIG. 15 shows an example of a 360 video zooming example.

FIG. 15 shows the example of 360 zooming, for example, to measure an equal quality viewport switching latency during a zooming operation. The device may request and receive a plurality of sub-pictures, such as sub-pictures A, B, C, D, E, and F. The device may generate the first viewport using sub-picture B and C as shown in 1510. The sub-pictures B and C may be high quality sub-pictures. The device may receive an input to zoom as shown in 1520, and in response, generate and display a second viewport. The second viewport may include a spherical region across sub-pictures A, B, C and D. The sub-pictures B and C may be in high quality, and sub-picture A and D may be in low quality. As such, the second viewport may be defined by a quality that is less than the quality of the first viewport. The device may request a different (e.g., new) representation of sub-picture A and D with higher quality (e.g., less quality ranking values) as shown in 1530, switch the sub-picture A and D from a low quality to a high quality, and generate an entire second viewport in high quality, as shown in FIG. 15(c).

The device may generate the EQViewportSwitchingLatency metric based on, for example, the time interval between FIG. 15(a) and FIG. 15(c), or the time interval between FIG. 15(b) and FIG. 15(c), for example, depending on which one or more of the following are used to determine equal quality viewport switch event. The EQViewportSwitchingLatency may be measured as the time (e.g., in milliseconds) from a sensor detection of a user's viewing orientation at the second viewport position and the time at which the second viewport content is fully rendered to the user in equal or higher quality than the quality of the first viewport being rendered before. The EQViewportSwitchingLatency may be measured as the time (e.g., in milliseconds) from a sensor detection of a user's viewing orientation at the second viewport position and the time at which the second viewport content is fully rendered to the user in higher quality than the quality of the second viewport when the first viewport is rendered.

A metrics computation and reporting module may use representation bitrate and/or resolution signaled in DASH MPD to determine a relative quality of a corresponding representation (e.g., instead of RWQR value). The device (e.g., the metrics computation and reporting module) may derive the quality of viewport from the bitrate and/or resolution of a (e.g., each representation) representation being requested, decoded, or rendered to cover the viewport. When a representation is not presented, the quality of the representation may be derived as the highest quality ranking value by default.

The device (e.g., the VR device) may generate and report initial latency metrics and messages. The device may use a metric to indicate a time difference between the start of head motion and that of the corresponding feedback in the VR domain. The metric may include initial latency metric (e.g., when an HMD is used). Compared to the viewport switching latency, the initial latency may have an HMD-dependent delay (e.g., based on the sensors, etc.). Table 7 shows example content of a report on initial latency metrics. The device or the metrics server may derive the initial latency metric and/or one or more of the entries shown in Table 7 from OP3 and/or OP4.

Table 7 shows example content of a report on initial latency metrics.

TABLE 7

| Key | Type | Description |
| --- | --- | --- |
| InitialLatency | List | List of initial latency measurements during playout. |
| Entry | Object | One initial latency measurement. |
| t | Real-Time | Time of the measurement. |
| latency | Integer | Initial latency in milliseconds. |

The device may use a metric to indicate the time difference between the stop of head motion and that of the corresponding feedback in the VR domain. The metric may include a settling latency metric (e.g., when using an HMD). Table 8 shows example content of a report on settling latency metrics. The device or the metrics server may derive the settling latency metric and/or one or more of the entries shown in Table 8 from OP3 and/or OP4.

TABLE 8

| Key | Type | Description |
| --- | --- | --- |
| SettlingLatency | List | List of settling latency measurements during playout. |
| Entry | Object | One settling latency measurement. |
| t | Real-Time | Time of the measurement. |
| latency | Integer | Settling latency in milliseconds. |

The device (e.g., the VR device) may report the latency metrics, for example, individually for every viewer head motion and/or viewport change. The device may comput and/or report average values over a predetermined time period, for example, at certain intervals. The metric server may measure the latency performance of different VR devices based on the latency metrics. The metrics sever may correlate the latency metrics with other data including one or more of content type, total viewing time, and frequency of viewport changes to determine how much a VR device-specific feature(s) impacts the user satisfaction. The metrics server may use initial and settling latencies, for example, to benchmark the HMDs and/or provide feedback for vendors.

A device (e.g., HMD, phone, tablet, or a personal computer) may request one or more DASH video segments and display the DASH video segments as various viewport with different qualities. The device may determine different types of latency and report the latency as a latency metric(s). The device may determine a latency metric(s) based on a time difference between displaying a current viewport and different point of time. The point of time may include one or more of the following: the device beginning to move, the device ceasing to move, the processor determining that the device has begun to move, the processor determining that the device has stopped moving, the display of a different viewport and/or a different quality.

Figure 16:
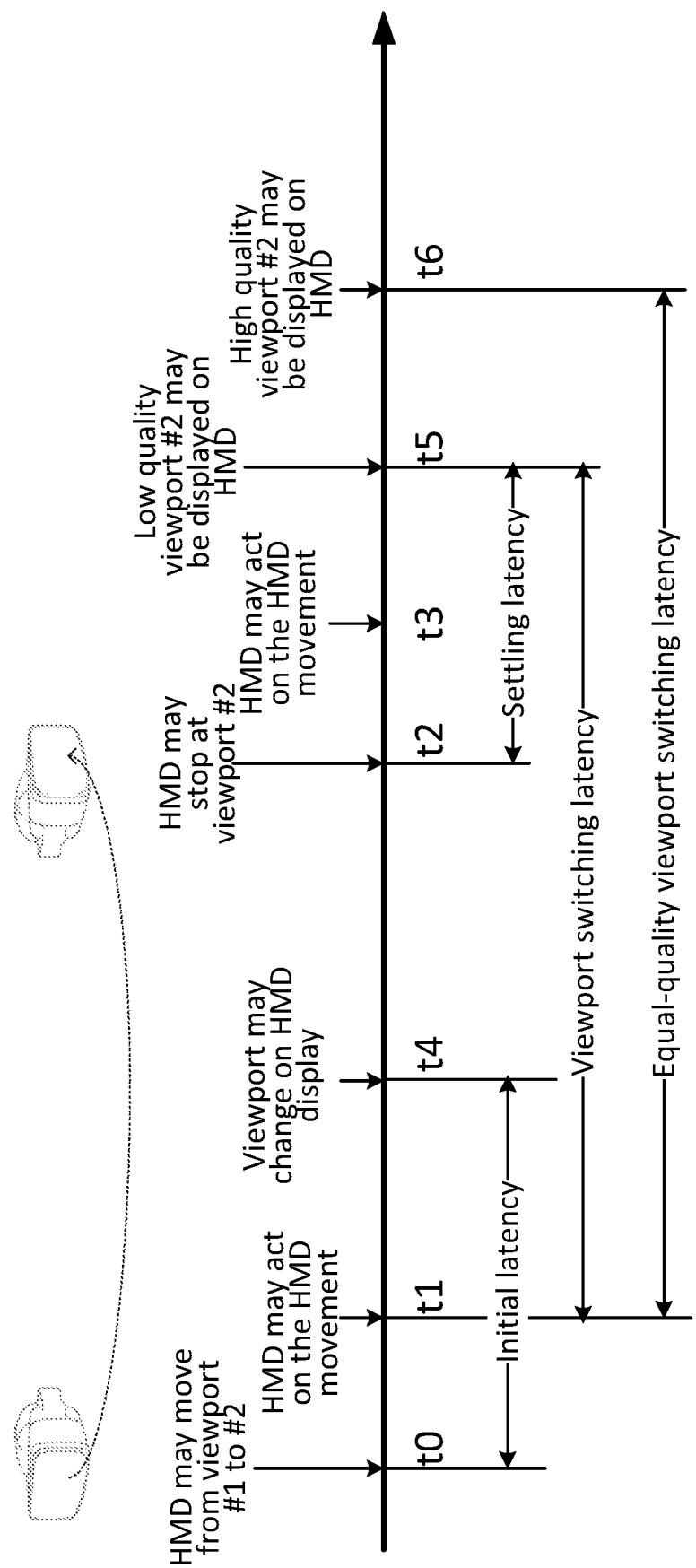
FIG. 16 shows an example of latency intervals.

FIG. 16 shows example latency intervals that may be reported by a DASH client (e.g., a VR device). The user's head/the device (e.g., HMD) may start to move from viewport #1 to viewport #2 at time t0. The user may watch viewport #1 at t0 (e.g, in HQ). The device may detect the movement from viewport #1 to viewport #2 and/or may act on the movement of the HMD at t1 (t1>=t0). The movement from viewport #1 to viewport #2 may affect the QoE of the user. For example, the device may reflect such head movement (e.g., on the HMD display), and the quality of viewport #1 may decrease after t1. The latency between t0 and t1 may vary depending on different devices (e.g., due to sensor, processor, etc.). If a motion (e.g., the head movement) is subtle (e.g., less than a threshold), the device may detect the motion but may not act on the motion. The head or the device may stop on viewport #2 at t2. The device may detect viewport #2 and may act on viewport #2 at t3 (t3>=t2). For example, at t3, the device may determine that the HMD has stopped in a position associated with viewport #2 for a predetermined amount of time (e.g., n milliseconds). The user may observe a viewport shift and/or quality change in HMD (e.g., the display of HMD) at t4. t4 may be less than, or before, t2 in time (e.g., the user may keep moving his head). The viewport change may complete (e.g., at t5), and the device may display at an initial low quality viewport at t5. The quality displayed at the device may recover. For example, the device may request one or more video segments (e.g., DASH segments) at a higher quality in order to generate viewport #2. As such, the quality of viewport #2 may be of a high quality (e.g., the same quality as the quality of the previous viewport #1 or greater quality than the previous viewport #1 at t6 (t6>=t5)). The device (e.g., the Metrics collection and processing (MCP) module) may collect input timing information from OP3 and/or a viewport presentation at OP4. The device (e.g., the MCP element) may derive the corresponding latency metrics, for example, based on one or more of the times t1-t6, to be reported to a metrics server (e.g., as shown in the client reference model in FIG. 7).

The various latency parameters may be measured, for example, by the VR device. The viewport switching latency may correspond to a time difference between t5 and t1. The equal-quality viewport switching latency may correspond to a time difference between t6 and t1. The initial latency may correspond to t4-t0. The settling latency may correspond to a time different between t5 and t2. In an embodiment, a point of time (e.g., the specific times in FIG. 16) may be recorded and/or reported by the device. For example, the device may generate a metric report, and the metric report may indicate t0, t1, t2, t3, t4, t5, and t6 upon detecting a head motion.

The device may use a metric to indicate on a location of a user. The metric may include the 6 DoF coordinates metric, for example, as described in Table 9. The device (e.g., the VR device) may report the 6 DoF coordinates metric, for example, to the metrics server. Local sensors may provide a location of the user. The device may extract 6 DoF coordinates based on the location of the user and/or HMD viewport data. The 6 DoF position may be expressed via 3D coordinates (e.g., X, Y, Z) of the user's HMD. The 6 DoF position may be expressed via a controller position in a VR room and relative spherical coordinate(s) (e.g., yaw, pitch and roll, the spherical coordinate center may be X, Y and Z) of the user's HMD or controller. The device or the user may signal multiple 6 DoF positions when the user is equipped with multiple controllers. Table 9 shows example content of a report on 6 DoF coordinates. The device or the metrics server may derive the 6 DoF coordinates metric and/or one or more of the entries shown in Table 9 from OP3.

TABLE 9

| Key | Type | Description |
| --- | --- | --- |
| 6DoFCoordinates | List | List of 6DoF coordinates measurements during playout. |
| Entry | Object | One 6DoF coordinates measurement. |
| t | Real-Time | Time of the measurement. |
| 6dofcoor | String | The 6DoF coordinates corresponding to the time of the measurement. |

The device (e.g., the VR device) may report gaze data. The metrics server may use the gaze data for analytics (e.g., targeting the ads). Table 10 shows example content of a report on Gaze data. The device or the metrics server may derive the gaze data metric and/or one or more of the entries as included in Table 10 from OP3. The device may use gaze data to decide how to configure and/or improve tile-based streaming (e.g., choosing the tile configuration).

TABLE 10

| Key | Type | Description |
| --- | --- | --- |
| GazeData | List | List of gaze data measurements during playout. |
| Entry | Object | One gaze data measurement. |
| t | Real-Time | Time of the measurement. |
| gazedata | String | The gaze data corresponding to the time of the measurement. |

The device (e.g., the VR device) may report a frame rate metric. A rendered frame rate may be different from a native frame rate. Table 11 shows example content of a report on rendered frame rate. The device or the metrics server may derive the frame rate metric and/or one or more of the entries as included in Table 11 from OP4.

TABLE 11

| Key | Type | Description |
|---|---|---|
| FrameRate | List | List of frame rate measurements during playout. |
| Entry | Object | One frame rate measurement. |
| tstart | Real-Time | Start time of the measurement. |
| tend | Real-Time | End time of the measurement. |
| framerate | Real | The average frame rate between the start and end time. |

General system quality of service (QoS) metrics or parameters such as packet/frame loss ratio, frame error ratio, and/or frame discard ratio may represent a service quality (e.g., for conventional video streaming). The general QoS metrics may not reflect a VR user experience for some streaming (e.g., for viewport dependent 360-degree video streaming such as tile-based streaming). For the conventional video streaming, some or all packets or frames may have similar or equal impact on a user experience. For viewport dependent 360-degree video streaming such as tile-based streaming, a user experience may be determined (e.g., partially or mainly determined) by the viewport that is presented to the user. For viewport-dependent 360-degree video streaming such as tile-based streaming, a packet or frame loss of other non-viewport tiles may not impact the user experience. For example, the user may not watch other non-viewport tiles. A packet or frame loss of a viewport tile(s) that the user watches may impact (e.g., have significant impact on) the user experience. The general QoS metric(s) may not reflect the VR user experience.

The device may use a metric to indicate a viewport loss event(s). The metric may include the viewport loss metric described in Table 12, for example. The device may use the viewport loss metric to report viewport loss event(s) for user experience analysis (e.g., for viewport dependent 360-degree video streaming such as tile-based streaming). For example, a client may determine whether a loss event(s) impacted the viewport displayed to the user or not, and/or may report via the ViewportLoss metric only the loss events which had an effect on the displayed viewport. The viewport loss metric may include one or more of timing information that indicates time when loss is observed and/or other loss information, as shown in Table 12. The device or the metrics server may derive the viewport loss metric and/or one or more of the entries as included in Table 12 from OP1 and/or OP3.

TABLE 12

| Key | Type | Description |
|---|---|---|
| ViewportLoss | List | A list of viewport segment loss during playout. |
| Entry | Object | |
| t | Real-Time | Time of the measurement. |
| sourceUrl | Real | The segment Url associated with the lost viewport. |
| lossreason | Enum | A reason(s) why the segment was lost, one or more of: server error client error packet loss packet error packet discard |
| error | String | Error description |

The ViewportLoss metric may report an event of a viewport segment loss and/or provide information or additional information about a loss status. An entry (e.g., the entry of "sourceUrl") may indicate (e.g., specify) the URL for a lost viewport segment. An entry (e.g., the entry of "lossreason") may indicate a cause(s) (e.g., the cause) of the segment loss, for example, including one or more of the reasons described herein.

An entry of the ViewportLoss metric (e.g., the entry "server error") may indicate (e.g., specify) the reason why a server fails to fulfill a viewport segment request (e.g., a particular viewport segment request). A list of HTTP response status 5xx server error code may be used, for example, 504 for "Gateway Timeout", 505 for "HTTP version not supported", etc. An entry of the ViewportLoss metric (e.g., the entry "client error") may indicate (e.g., specify) a client error when a client requests a (e.g., a particular) viewport segment. A list of HTTP response status 4xx client error code may be used, for example, 401 for "Unauthorized", 404 for "Not Found", etc. An entry of the ViewportLoss metric (e.g., the entry "packet loss") may indicate (e.g., specify) that one or more packets of viewport segment associated with sourceUrl fail to reach their destinations. An entry of the ViewportLoss metric (e.g., the entry "packet error") may indicate (e.g., specify) that one or more packets of viewport segment associated with sourceUrl are invalid. An entry of the ViewportLoss metric (e.g., the entry "packet discard") may indicate (e.g., specify) that one or more packets of viewport segment associated with sourceUrl are discarded. An entry of the ViewportLoss metric (e.g., the entry "error") may provide a detailed (e.g., a further detailed) error message. For example, the field "error" may provide an HTTP response error code, such as 504 that corresponds to "Gateway Timeout", 505 that corresponds to "HTTP version not supported", 401 that corresponds to "unauthorized", 404 that corresponds to "not found", and/or the like. With the ViewportLoss metric described herein, the metric server may be able to analyze the impact of a network condition on the VR user experience and/or track a root cause(s).

The device (e.g., the VR device) may generate and/or report HMD-related metrics such as precision and/or sensitivity. The device may use a metric to indicate angular positioning consistency between physical moves and visual feedbacks in the VR domain in terms of degrees. The metric may include a precision metric. Table 13 shows example content of a report on HMD precision. The device or the metrics server may derive the precision metric and/or one or more of the entries as included in Table 13 from OP3 and/or OP5.

TABLE 13

| Key | Type | Description |
|---|---|---|
| Precision | List | List of precision measurements during playout. |
| Entry | Object | One precision measurement. |
| T | Real-Time | Time of the measurement. |
| precision | Real | Angular positioning consistency in terms of degrees. |

For example, at time t, the user's head may be pointed at coord-A, but the imagery displayed to the user may reflect coord-B. The precision metric may correspond to the difference (e.g., coord-B minus coord-A). For example, the user may move his/her head 3 degrees to the right, and the imagery displayed on the HMD may reflect that the user moved 2.5 degrees to the right and 0.2 degrees down. The precision metric may indicate the measured difference, e.g., horizontal 0.5-degree difference and vertical 0.2-degree difference. The metric may report the difference. The difference may be in the form of a delta-coord (e.g., vector). The difference may be in the form of an absolute difference (e.g., single value). An HMD and/or controller may provide the precision metric. The HMD may be comprised in the VR device. Such delta value may vary depending on the distance between the sensor and the user.

The device may use a metric to indicate the capability of the HMD inertial sensors to perceive subtle motions and subsequently provide feedback to users. The metric may include a sensitivity metric. Table 14 shows example content of a report on HMD sensitivity. The device or the metrics server may derive the sensitivity metric and/or one or more entries as included in Table 14 from OP3 and/or OP5.

TABLE 14

| Key | Type | Description |
| --- | --- | --- |
| Sensitivity | List | List of sensitivity measurements during playout. |
| Entry | Object | One sensitivity measurement. |
| t | Real-Time | Time of the measurement. |
| sensitivity | Real | Sensitivity in terms of degrees. Motions smaller than this value may not be detected by the HMD. |

The device and/or the metric server may use precision and sensitivity in various ways. A content provider or a server may offer to the user customized content recommendation(s) based on the precision and/or sensitivity of the HMD. The content provider, the server, or the device may collect the precision and/or sensitivity metrics on a VR device model/brand level and/or share the metrics with the manufacturers (e.g., of the VR device) to fix issues and/or improve the devices.

The device (e.g., the VR device) may send precision and/or sensitivity as a PER message. A DANE may send a precision and/or a sensitivity message to a DASH client (e.g., including the VR device). The device or the DANE may send the appropriate precision/sensitivity settings for the selected content to a configurable HMD. A viewer's viewing experience for the selected content may be enhanced. Table 15 shows example content of a precision message. Table 16 shows example content of a sensitivity message.

TABLE 15

| Parameter | Type | Cardinality | Description |
| --- | --- | --- | --- |
| Precision | Object | 1 | |
| t | Media-Time | 1 | Time corresponding to setting the precision. |
| precision | Real | 1 | Angular positioning consistency in terms of degrees. |

TABLE 16

| Parameter | Type | Cardinality | Description |
| --- | --- | --- | --- |
| Sensitivity | Object | 1 | |
| t | Media-Time | 1 | Time corresponding to setting the sensitivity. |
| sensitivity | Real | 1 | Sensitivity in terms of degrees. Motions smaller than this value will be ignored by the HMD. |

The device (e.g., the VR device) may generate ROI-related messages. A ROI message may be of PER type. The ROI message may indicate to the viewer a desired ROI. A DASH client may prefetch the desired ROI in advance. The ROI message may indicate to DASH client to prefetch the desired ROI in advance. The ROI may vary over time. The device or the content provide may infer the ROI from the viewport view statistics. The device or the content provide may dictate the ROI (e.g., director's cut). The device or the content provide may determine the ROI based on an analysis in real time. A DANE may send the ROI information as a PER message to the DASH client. Based on the ROI information, the DASH client may determine which tile/segment/byte range to fetch from the server. For example, the device or the metric server may derive the ROI message from OP4.

ROI may indicate an area of VR that is of high priority in term of appeal, importance or quality (e.g., a hint to the user to make decision in advance). The user may watch the front face consistently. With ROI message, the user may be prompted to watch another area, but may still watch the front face of the video.

The DANEs may receive the ROI information as a PED message for prefetching and improved caching performance. In the PED message, if the ROI is provided, the DANE may determine which tile/segment/byte range is to be fetched. In the PED message, the specific URL(s) may be provided. An ROI information message may be sent from a DANE to another DANE. Table 17 shows example content of a ROI information message.

TABLE 17

| Parameter | Type | Cardinality | Description |
| --- | --- | --- | --- |
| ROI | Object | 1 | |
| t | Media-Time | 1 | Time corresponding to setting the ROI. |
| roi | Viewport | 1 | Region of interest. |

The ROI information can be carried in a timed metadata track or in an event stream element.

Figure 17:
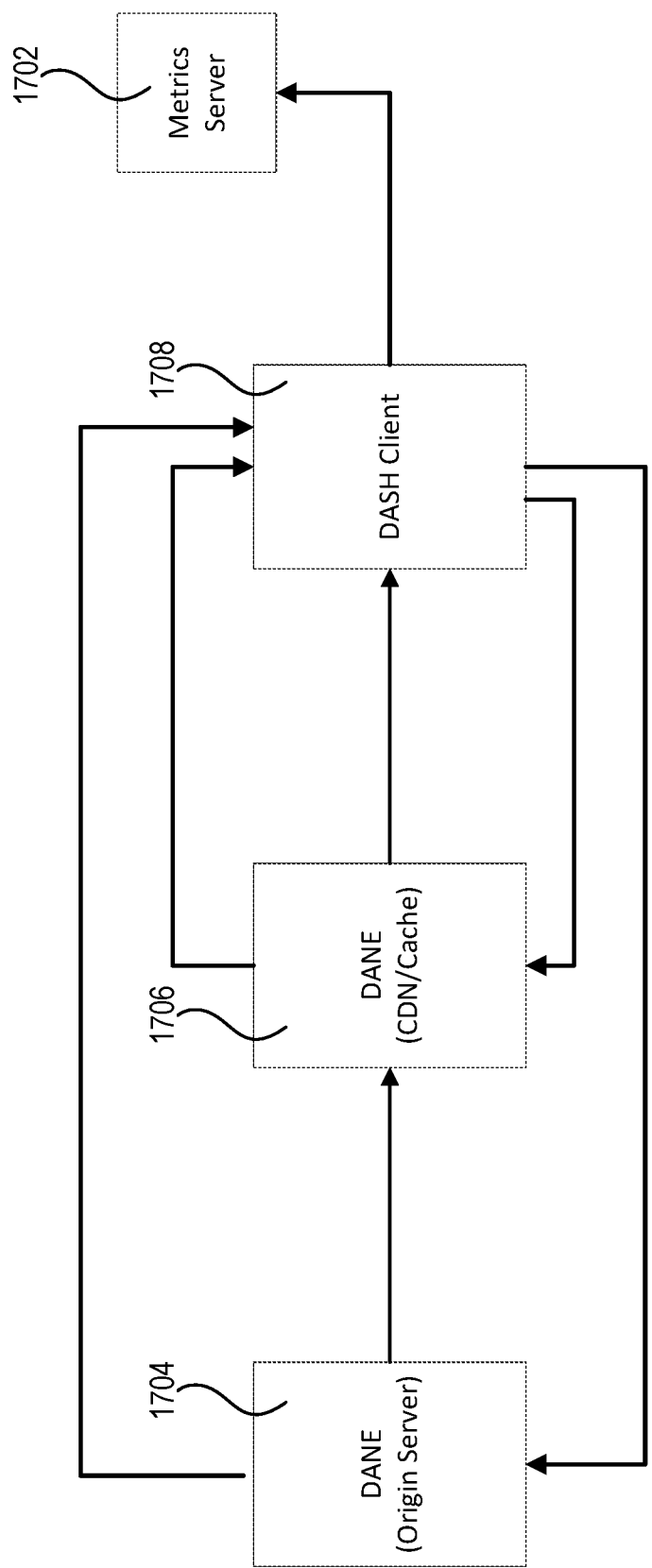
FIG. 17 shows an example of a message flow of SAND messages between DANE and DASH clients or between the DASH client and a metrics server.

FIG. 17 shows the message flow of SAND messages between DANE and DASH clients or between the DASH client to a metrics server. The DANE 1704 (e.g., an origin server) may send video segments to DANE 1706 (e.g., CDC/Cache). The DANE 1706 (e.g., CDC/Cache) may send video segments to DASH client 1708. The to DASH client 1708 may send the metrics to the metrics server 1702. The metrics may include one or more of viewport views, rendingdevice, viewportswitchinglatency, initiallatency, settlinglatency, 6 DoFCoordinates, GazeData, FrameRate, Precision, Sensitivity, and/or the like. The DANE 1704 (e.g., an origin server) may send information (e.g., initialrenderingorientation, precision, sensitivity, ROI, and/or the like) to DASH client 1708. The DANE 1706 (e.g., CDC/Cache) may send the information (e.g., initialrenderingorientation, precision, sensitivity, ROI, and/or the like) to the DASH client 1708. The DASH client 1708 may send information (e.g., the rendering device, viewportswitchinglatency, framerate, and/or the like) to the DANE 1706 (e.g., CDC/Cache) or the DANE 1704 (e.g., an origin server).

The device may detect, derive, and/or report the metrics and/or a change of the metrics herein to the metric server(s) for analysis and/or calculations on the metric server(s). The VR device, the metrics server, and/or a controller may perform one or more of the detection, derivation, analysis, and/or calculations.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A device for receiving and displaying media content, the device comprising:
   a processor configured to:
   display a first viewport comprising at least a portion of one or more dynamic adaptive streaming over HTTP (DASH) video segments;
   determine a movement from the first viewport towards a second viewport at a first time, wherein, at the first time, the first viewport is displayed at a first presentation quality;
   display the second viewport, the second viewport comprising at least a portion of one or more DASH video segments, wherein the first viewport and the second viewport are different;
   determine a second time, wherein, at the second time, the second viewport is displayed at a second presentation quality, and wherein the second presentation quality of the second viewport is comparable to the first presentation quality of the first viewport;
   determine a quality viewport switching latency metric based on a difference between the first time and the second time; and
   send the quality viewport switching latency metric.

2. The device of claim 1, wherein the processor is configured to determine that the second presentation quality is comparable to the first presentation quality when the second presentation quality is equal to or greater than the first presentation quality.

3. The device of claim 1, wherein the processor is configured to determine that the second presentation quality is comparable to the first presentation quality when the second presentation quality is equal to or greater than a quality threshold.

4. The device of claim 1, wherein each of the one or more DASH video segments of the first viewport has a respective quality, and wherein the first presentation quality is determined based on a relative portion of the one or more DASH video segments covering the first viewport and the respective quality of the one or more DASH video segments.

5. The device of claim 1, wherein the processor is configured to determine the first presentation quality using at least one of an average, a maximum, a minimum, or a weighted average of a respective quality of the one or more DASH video segments of the first viewport.

6. The device of claim 1, wherein the movement from the first viewport towards the second viewport at the first time comprises one or more of the movement outside of the first viewport, an orientation change of the device, or a zooming operation.

7. The device of claim 1, wherein the processor is configured to detect the movement from the first viewport towards the second viewport at the first time when a change of one or more viewport switching parameters is equal or greater than a threshold, wherein the viewport switching parameters comprise one or more of centre_azimuth, centre_elevation, centre_tilt, azimuth_range, and elevation_range.

8. The device of claim 1, wherein the quality viewport switching latency metric is a comparable quality viewport switching latency metric.

9. The device of claim 1, wherein the first presentation quality is indicated by a first quality ranking value associated with the one or more DASH video segments of the first viewport and the second presentation quality is indicated by a second quality ranking value associated with the one or more DASH video segments of the second viewport.

10. The device of claim 1, wherein the processor is further configured to:
    determine a viewport switching latency metric based on a time difference between the first time and a time associated with an initial display of the second viewport, wherein the initial display of the second viewport is associated with a presentation quality that is less than the second presentation quality; and
    send the viewport switching latency metric.

11. A method implemented by a device for receiving and displaying media content, comprising:
    displaying a first viewport comprising at least a portion of one or more dynamic adaptive streaming over HTTP (DASH) video segments;
    determining a movement from the first viewport towards a second viewport at a first time, wherein, at the first time, the first viewport is displayed at a first presentation quality;
    displaying the second viewport, the second viewport comprising at least a portion of one or more DASH video segments, wherein the first viewport and the second viewport are different;
    determining a second time, wherein, at the second time, the second viewport is displayed at a second presentation quality, and wherein the second presentation quality of the second viewport is comparable to the first presentation quality of the first viewport;
    determining a quality viewport switching latency metric based on a difference between the first time and the second time; and
    sending the quality viewport switching latency metric.

12. The method of claim 11, comprising determining that the second presentation quality is comparable to the first presentation quality when the second presentation quality is equal to or greater than the first presentation quality.

13. The method of claim 11, comprising determining that the second presentation quality is comparable to the first presentation quality when the second presentation quality is equal to or greater than a quality threshold.

14. The method of claim 11, wherein each of the one or more DASH video segments of the first viewport has a respective quality, the method further comprising determining the first presentation quality based on a relative portion of the one or more DASH video segments covering the first viewport and the respective quality of the one or more DASH video segments.

15. The method of claim 11, the method further comprising determining the first presentation quality using at least one of an average, a maximum, a minimum, or a weighted average of a respective quality of the one or more DASH video segments of the first viewport.

16. The method of claim 11, wherein the movement from the first viewport towards the second viewport at the first time comprises one or more of the movement outside of the first viewport, an orientation change of the device, or a zooming operation.

17. The method of claim 11, the method further comprising detecting the movement from the first viewport towards the second viewport at the first time when a change of one or more viewport switching parameters is equal or greater than a threshold, wherein the viewport switching parameters comprise one or more of centre_azimuth, centre_elevation, centre_tilt, azimuth_range, and elevation_range.

18. The method of claim 11, wherein the quality viewport switching latency metric is a comparable quality viewport switching latency metric.

19. The method of claim 11, wherein the first presentation quality is indicated by a first quality ranking value associated with the one or more DASH video segments of the first viewport and the second presentation quality is indicated by a second quality ranking value associated with the one or more DASH video segments of the second viewport.

20. The method of claim 11, the method further comprising determining a viewport switching latency metric based on a time difference between the first time and a time associated with an initial display of the second viewport, wherein the initial display of the second viewport is associated with a presentation quality that is less than the second presentation quality; and sending the viewport switching latency metric.

* * * * *